(12) United States Patent
Desnoyers

(10) Patent No.: US 7,322,173 B2
(45) Date of Patent: Jan. 29, 2008

(54) HAY BALE BUNDLING APPARATUS AND METHOD

(76) Inventor: Gilles H Desnoyers, 17 Elgin Street East, Alexandria, ON (CA) K0C 1A0

(*) Notice: Subject to any disclaimer, the term of this patent is extended or adjusted under 35 U.S.C. 154(b) by 0 days.

(21) Appl. No.: 11/419,033

(22) Filed: May 18, 2006

(65) Prior Publication Data
US 2007/0033905 A1    Feb. 15, 2007

Related U.S. Application Data

(60) Provisional application No. 60/682,383, filed on May 19, 2005.

(51) Int. Cl.
  *B65B 11/04* (2006.01)
(52) U.S. Cl. .......................... 53/587; 53/211
(58) Field of Classification Search .................. 53/211, 53/587
  See application file for complete search history.

(56) References Cited

U.S. PATENT DOCUMENTS

| | | | |
|---|---|---|---|
| 3,994,118 A * | 11/1976 | Felix .......................... | 53/529 |
| 4,302,141 A * | 11/1981 | Miguel ..................... | 414/796.4 |
| 4,343,132 A * | 8/1982 | Lawless, Jr. ................. | 53/399 |
| 4,409,784 A | 10/1983 | Van Ginhoven et al. | |
| 4,461,136 A * | 7/1984 | Hudson et al. ............... | 53/399 |
| 4,563,857 A | 1/1986 | Bergling et al. | |
| 4,604,018 A * | 8/1986 | Kruse ....................... | 414/789.7 |
| 4,730,436 A | 3/1988 | Angelino | |
| 4,821,489 A | 4/1989 | MacLeod et al. | |
| 5,038,549 A | 8/1991 | Nordstrom | |
| 5,129,215 A * | 7/1992 | Gratton ....................... | 53/587 |
| 5,224,323 A | 7/1993 | Fykse | |
| 5,638,749 A * | 6/1997 | Ansbjer et al. ............... | 100/87 |
| 5,660,023 A * | 8/1997 | Kivela ........................ | 53/399 |
| 5,740,662 A * | 4/1998 | Royneberg et al. ........... | 53/556 |
| 5,799,466 A * | 9/1998 | Underhill ..................... | 53/399 |
| 5,822,957 A | 10/1998 | Esch | |
| 6,397,738 B1 | 6/2002 | Brown, Jr. | |
| 6,745,544 B2 | 6/2004 | Matsumoto | |
| 6,758,028 B1 | 7/2004 | Underhill | |

* cited by examiner

*Primary Examiner*—John Sipos
(74) *Attorney, Agent, or Firm*—David J. French

(57) ABSTRACT

A hay bale bundler machine to receive individual bales of hay or other forage material from a field and to create a bundle of individual bales wrapped with a wrapping material for discharge back to the ground. Further included may be a fully automatic device that can be mounted directly to a hay baler to receive bales without them being discharged to the ground and to assemble such bales on the hay bale bundling machine for wrapping. The wrapping of the stack of bales to form a bundle proceeds by grasping the stack with a rotatable clamping means and removing the support surface from beneath the stack in order to permit rotation and wrapping of the stack to occur.

16 Claims, 21 Drawing Sheets

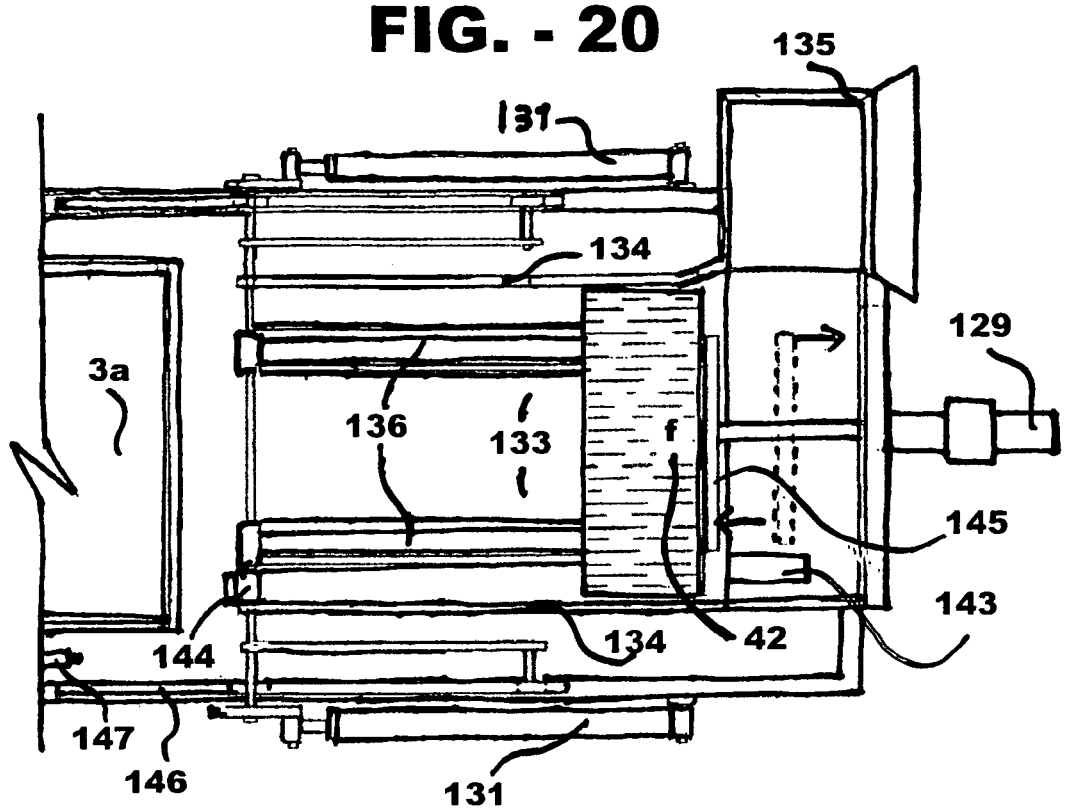
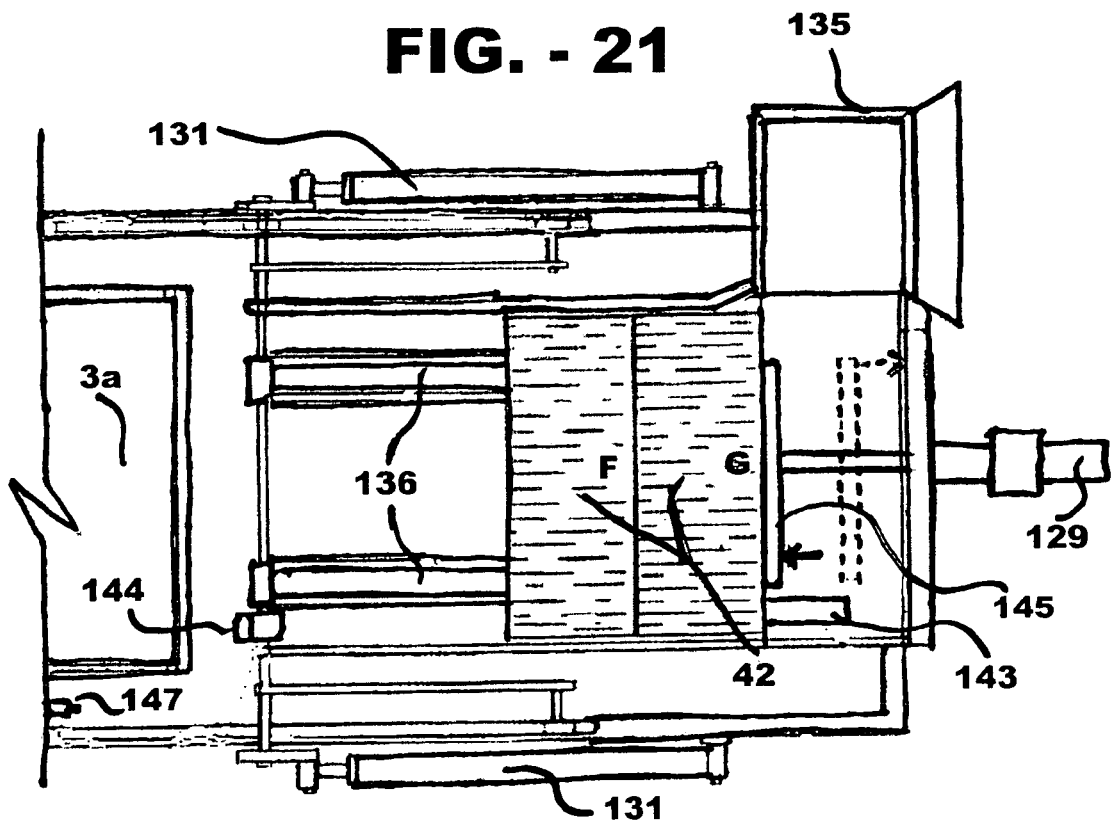

HAY BALE BUNDLING APPARATUS AND METHOD

This application is based on and claims priority from U.S. Provisional Patent Application No. 60/682,383, filed on May 19, 2005, entitled HAY BALE BUNDLING APPARATUS AND METHOD.

FIELD OF THE INVENTION

This invention relates to a machine for combining multiple, individual hay bales into larger bundles. More particularly, it relates to a mobile bundling apparatus that can follow a baler in the field, converting individual bales into larger hay packages. The invention also relates to a combination of the bundler with bale stacking apparatus, and to a method for bundling hay bales and wrapping the bundle.

BACKGROUND TO THE INVENTION

For more than the last 100 years, farmers have been baling hay in manually manageable hay bales which are generally rectangular. The typical size for such a hay bale is 36 to 38 inches running the length of the bale across as the hay fibers, with an end panel of approximately 14"×18" in dimension. Thus the face of the hay with exposed fiber ends has a dimension of 36"×14". This traditional-formatted bale is held together by two wrappings of binder twine which extend down the length of the 36 inch sides and around the ends, enclosing the parallel hay fibers.

Some 25 years ago farmers started to switch over from standard sized bales to either rolls or giant sized bales. Rolled hay produces a single round bale that is approximately 5 feet in diameter and approximately 4 feet long, in the direction of the central axis. Polyester netting is used to wrap the round bales three or four times. The netting has openings which are approximately 1 to 2 inches square. There is no need to fasten the final cut end of the netting, since enough of the hay sticks out from the spiral round bale that the netting snags on protruding fibers.

The disadvantage of the round bales is that the hay has to be unwound; at least, the easiest way to remove hay from the bale is to unwind the spiral. But this is not nearly as convenient as removing a standard bale and carrying a standard bale to where animals are to be fed.

Additionally, giant sized bales that are 4 by 4 by 8-10 feet in cubic dimensions have been increasingly introduced into agriculture. In both cases, these larger hay bales require farm machinery, e.g. a forklift or a tractor with a front-end lift, to move the bales. Farmers are increasingly turning to large sized bales. It is very hard to get farm laborers today who will move standard sized bales by hand, since it is backbreaking work.

On the other hand, the customer may often prefer the standard sized bale. In particular, horse owners have a need for standard sized bales so the hay can be stored in a hayloft and moved in manageable amounts to feed the horses. This invention addresses a compromise between these two competing interests.

A Spanish company, "Arcusin" has built a machine that bundles 14 small bales into a large square held together by binder twine. The Spanish machine follows a standard hay baler in the field, collecting the 14 bales and fastening them together for deposit on the ground behind. These large bale-bundles are then loaded by machine onto wagons and trucks for delivery. In this specific machine, the hay bales rest on a surface while they are wrapped with the binder twine.

An American company in Pittsfield, Ill. makes a machine called a "Bale Band-It" that bundles individual hay bales, wrapping the bales together with wire. This unit is pulled behind a standard baler. As the bales exit the baler they are directed into the "Bale Band-It". When 21 small bales are in the chamber, the bales are bundled together by wrapping them with steel banding wire. During this wrapping process, the bales rest on a support surface.

U.S. Pat. No. 5,799,466 shows a device where a plurality of small bales are stacked, lifted by articulated arms and wrapped in a several different types of materials, then the arms lower the wrapped bundle to the ground. Using the arms to lift the stacked bales and rotate them while being suspended in the air requires a rather complicated and expensive device.

U.S. Pat. No. 6,397,738 describes an automated hay bale stacking and bundling system wherein hay bales are elevated vertically in order to be placed in a stack, from above.

There remains a need to overcome the disadvantages of the prior art by providing a machine to pick up bales of hay from the field or from the baler, to stack the bales in a manual or a mechanical way in a predetermined package shape and size, then wrap the packages with netting or plastic before discharging the wrapped package to the field. There remains a further need to accomplish this using a relatively inexpensive piece of machinery. This invention addresses those needs.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the present invention, a hay bundling apparatus or "hay bundler" for wrapping a plurality of hay bales into a hay bale bundle is provided. The wrapping of the stack of bales to form a bundle proceeds by grasping the stack with a rotatable clamping means and removing the support surface from beneath the stack in order to permit rotation and wrapping of the stack to occur.

This hay bundling apparatus for wrapping a plurality of hay bales into a hay bale bundle may comprise:
a) a support surface for receiving as a stack individual hay bales to be assembled into a bundle;
b) a pair of clamping means positioned for grasping said stack of hay bales, said clamping means being rotatable about a fixed axis;
d) first actuation means for effecting movement of the clamping means to grasp the stack of bales when it is positioned on the support surface; and
e) second actuation means to rotate the clamping means and stack of hay bales grasped between the clamping means, wherein the support surface is capable of occupying two positions namely, a first position wherein the support surface supports the stack of bales in position between the clamping means before rotation, and a second position wherein the support surface is removed from beneath the stack of bales after the clamping means have engaged the bales so as to provide sufficient clearance to permit the clamping means to rotate the stack of bales.

This hay bundling apparatus may further comprise means for dispensing wrapping material for enveloping the stack of bales while the stack is being rotated by the clamping means whereby, when the floor is in the second position with the stack of bales grasped between and being rotated by the clamping means, wrapping material may be dispensed to envelop the stack of hay bales to form said hay bundle.

More particularly, this apparatus may comprise a frame with a floor, a front portion for receiving individual hay bales and a back end portion for dispensing bundled bales. Optionally the apparatus may be provided with at least two wheels for movement along the ground. Stop means in the form of a rear gate may be positioned along the back end of the frame, the gate being moveable from a closed position to contain hay bales on the floor before bundling to an open position to allow removal of the bundled bales from the frame thereafter.

A feature of the invention is the presence of a pair of rotatable clamping means, preferably in the form of panels, mounted along each side of the frame. While described as panels, these clamping means function as grasping means for engaging and containing multiple bales of hay. Accordingly, they need not necessarily comprise a flat bearing surface but may, for example, consist of a field of bale-engaging spikes; for example the spikes could be arranged along a series of radial spokes. These clamping means or panels are positioned laterally on either side of a portion of the floor upon which hay bales are to be assembled. Such panels may be oriented in an upright plane perpendicular to the floor in order to receive the stack of bales there between. The frame includes first actuation means for effecting movement of the clamping panels towards each other to grasp a stack of bales positioned there between, and a second actuation means to rotate the panels about a common axis with a bundle of the hay bales grasped between the clamping panels. The axis of rotation is preferably fixed relative to the frame and is close to the center of the panels, and will also be fairly close to the center of gravity of the bundle.

The floor has an adjustable portion which is capable of occupying two positions. In the first position the floor is elevated and aligned to support the bales of hay to be grasped by the clamping panels before rotation. In the second position the floor is removed, such as by being lowered, from beneath the assembled bundle of bales after the clamping panels have engaged the bales. The floor, when in this second position, is removed from the bundled bales so as to provide sufficient clearance to permit the clamping panels to rotate the bales about the fixed axis of the panels, allowing the bundle to be wrapped with wrapping material so as to secure the bales within the bundle.

Various means may be provided to allow the adjustable floor portion to take up its second position. The adjustable floor portion may be in the form of a trap door provided with a first end which is pivotably connected to the frame, as by a hinge means, allowing a second end of the floor portion to pivot downwardly from the first position. Before pivoting, the floor portion is held within the frame at the second end by a pair of latches connecting the second end to the frame. The action of the floor in pivoting downwards allows clearance for the clamping panels, and for the assembled hay bales carried by the panels, to rotate while a roll of dispensed wrapping material envelops the hay bales into a bundle. The pivoting floor portion is preferably pivoted at its front end so that when lowered it assists in removing the bundle of bales from the rear end of the machine.

Various types of wrapping material may be used including string and sheeting, such as polyethylene film. A preferred wrapping material is netting which is wrapped around the bales most suitably transversely to the direction of the binder twine. An advantage of using netting is that, once a bundle is formed, the multiple layers of netting can be severed and a single bale removed without the bundle otherwise falling apart. Because the netting snags on the sides of the bales, even when cut, the netting remains in place holding the remaining bales in position.

The apparatus described above is efficient in terms of energy, as well as simplicity, since unlike in the prior art '466 patent referred to above there is limited need for lifting bales, and the whole bundle does not need to be lifted as a unit. Rather, a method used in the invention involves:

forming a first series of side-by-side bales into a first vertical stack positioned on an adjustable floor portion;

forming a second series of bales into a second vertical stack positioned against the first stack;

forming one or more subsequent vertical stacks of bales adjacent to the previously positioned stacks to form a generally rectangular assembly of bales, clamping opposed sides of said assembly between a pair of clamping means which are arranged to rotate about a common fixed horizontal axis;

allowing said adjustable floor portion to be lowered such that it does not prevent rotation of said assembly of bales when rotated about said axis; and rotating said clamping panels to rotate the assembly of bales while applying wrapping material to form a wrapped bundle.

Preferably the series of side-by-side bales are formed by means of a bale stacking apparatus, and the procedure includes feeding individual bales into the apparatus and forming a first side-by-side row of the bales, and then pivoting the first row upwards through about a right angle to form a first of the vertical stacks, before pushing said vertical stack into position on said back area of the adjustable floor portion, and repeating these operations to form the assembly of bales.

The bale stacking apparatus may be a mobile, automatic bale-stacking device. In such case, the hay bundler is provided with wheels and a coupling means for removably attaching the hay bundler to a pre-existing type of hay baler. The components of the automatic bale-stacking device may be conveniently positioned either in front of the bundler frame or within that frame itself. This latter option will be described next.

Bales produced by a standard prior art hay baler arrive presented to the automatic bale-stacking device with a generally horizontal orientation. The bales are then reoriented into an upright orientation so that they stand on a bale-receiving portion of the floor of the frame on one of their smaller end faces. This reorientation can be effected by a number of means including by way of machinery which manipulates the bales. It may also occur by allowing the bales to tip under gravity when they are delivered from the hay baler to the hay bale stacker, falling from an elevated position and horizontal orientation and turning, initially, to occupy a vertical orientation while falling into a receiving area so that their end faces would normally strike and finally rest upon the bale receiving floor portion. This represents a rotation of the bales through 90° in space.

The up-ended bales may then be assembled into a bundle between the clamping panels. As an example, this may be affected by having the up-ended bales slid by, for example, hydraulically actuated guide arms, across the extended frame floor portion consecutively until a number e.g. four, of the up-ended bales have been assembled in a row. A further bale positioning means, again for example a hydraulically actuated pushing bar, may then advance the assembled, up-ended bales together as a group onto the floor surface between the clamping panels. This procedure may be carried out for a number of cycles e.g. three, until a "cube" e.g. a rectangular solid, of upended bales is present between the clamping panels. At that point, loading of the clamping panel station may cease. Then the clamping panels may engage the hay bales and floor portion beneath the hay bales may retire towards its second position. The bundling of the hay bales may then proceed as previously described.

While it is possible to assemble a bundle of bales wherein each individual bale in the bundle is vertically orientated as just described, i.e. upended, according to a preferred embodiment of the invention the arriving bale is rotated a second time from its initial upright orientation through a further 90° until the bale lies horizontally on the floor of the bale stacker which is also the front portion of the bundler. This requires rotating the bale in a second plane which is orthogonal to the original plane corresponding to the orientation of the bale as originally presented to the automatic bale-stacking device.

This rotation may be effected in the number of ways. One way is to use a mechanical device that will force the hay bale to assume the new orientation. A preferred means for reorienting the bale is to direct the bottom end face of the upended ball onto an inclined surface extending upwardly within the receiving area from the floor beneath. This inclined surface redirects the upended bail to fall within the second plane until it lies horizontally on the floor adjacent to the receiving area.

It is standard in hay balers for a bale to exit the baler with the string or twine enveloping the hay extending along the upright and underneath surfaces of the bale. This orients the ends of the hay fibers to be exposed on either side of the bale. After the last manipulation has been completed, as previously described, a bales so delivered to the automatic bale stacking device will lie on the floor with the ends of the hay fibers on one side in contact with the floor.

A bale so positioned is then slid by, for example, hydraulically actuated advancement mechanism, across the extended frame floor portion of the stacker clearing a space for a further bale to be deposited in front of the advancement mechanism. The process of receiving additional bales may then proceed consecutively until a number e.g. four, of the reclining bales have been assembled in a row.

The assembled rows of bales lying horizontally on the floor of the stacker are then each elevated as a unit or "rack" (or stack) by lifting means, such as hydraulically actuated arms, that swing in each assembled row upwardly through an angle of 90° or more to deposit the rack on a portion of the floor proximate to the clamping panels. A further bale positioning means, again for example a hydraulically actuated pushing bar, may then advance the assembled, up-ended stack of bales together as a group onto the floor surface of the bundler between the clamping panels and towards the gate. Alternately, and preferably, the rack of bales is directly slid along the floor between the clamping panels, and the upending and pushing of a subsequent rack of bales has the effect of advancing an earlier rack of bales further into the region between the clamping panels. This procedure may be carried out for a number of cycles e.g. three, until a "cube" i.e. a rectangular solid, of upended bales is present between the clamping panels. At that point, loading of the clamping panel station may cease. Then the clamping panels may engage the hay bales and the floor portion beneath the hay bales may be withdrawn or lowered towards its second position. The bundling of the hay bales may then proceed as previously described.

While the automatic bale-stacking device has been described as integrated into the frame of the hay bundler, it may also be constructed as a separate apparatus. In this case the bale stacking device or apparatus would possess its own frame with a front end and a back end; means to removably attach the bale stacking apparatus to a hay baler positioned at its front end; and means to removably attach the bale stacking apparatus to a hay bundler as described at its back end. Once connected, this bale stacking apparatus would serve to guide individual hay bales received from a standard hay baler into an assembled bundle for wrapping by the hay bundler.

The foregoing summarizes the principal features of the invention and some of its optional aspects. The invention may be further understood by the description of the preferred embodiments, in conjunction with the drawings, which now follow.

BRIEF DESCRIPTION OF THE DRAWINGS

FIG. 20 through FIG. 23 are top views of the automatic bale-stacking machine sequentially showing the additional of up to four bales.

DESCRIPTION OF THE PREFERRED EMBODIMENT

Figure 1:
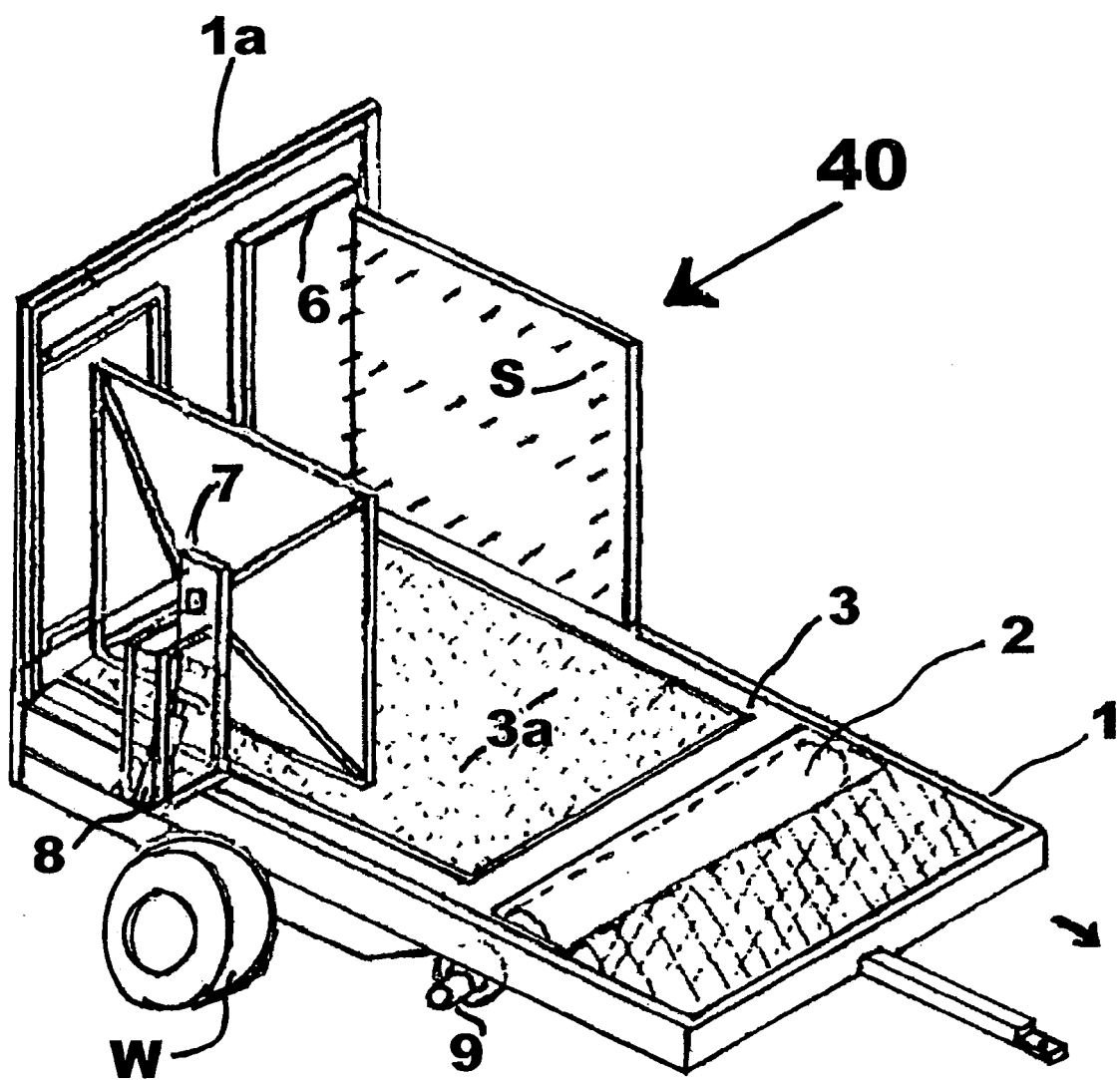
FIG. 1 is a perspective view of the hay bale bundling machine.

Referring first to FIGS. 1 through FIG. 12, a hay bundling machine 40 for receiving small, rectangular, bales of hay from a hay baler, accumulating the bales into cube-shaped stacks manually, wrapping the bales with a wrapping material, and ejecting the packaged bundle can be seen.

The hay bundler 40 is provided with a frame 1 moveably supported over the ground by wheels W, preferably including a front castor wheel (not shown). The machine 40 is adapted for connection to a standard, prior art baler (not shown in FIG. 1) by a tongue and coupling. The standard baler is typically connected to a tractor (not shown) in a conventional manner that will provide transportation power to move the baler and the machine 40 over the field. Hydraulic power is supplied by the tractor to operate the hydraulic functions of the machine 40, as described in greater detail below.

The machine 40 is towed over the field by the baler and the tractor. The machine 40 has a floor 3 which includes a dropping portion 3a located between clamping panels 4, this dropping portion being urged upwards by spring means 26 indicated in FIG. 5. As the baler ejects the bales of hay, a person operating the system of FIGS. 1 to 12 manually stacks the bales in their appropriate place on the floor of the unit to form a series of vertical stacks between the clamping panels 4, as can be best seen in FIG. 8. A section of wrapping material 2 extends across the floor 3 over which the bales 42 are placed.

Figure 5:
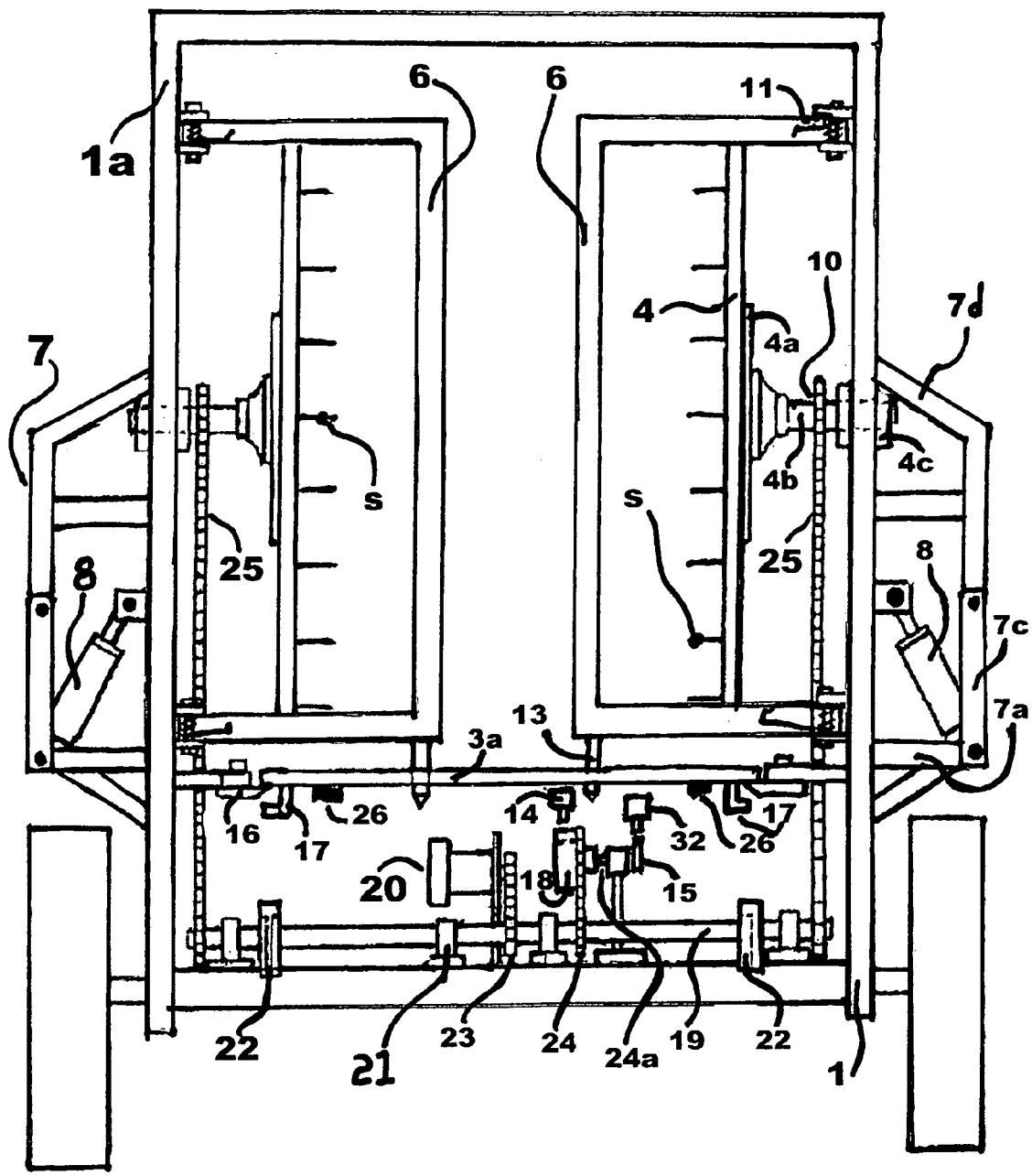
FIG. 5 is a rear plan view of the machine with the floor in the raised position and the gates closed, illustrating the rotation mechanism for the two clamping panels.
Figure 6A:
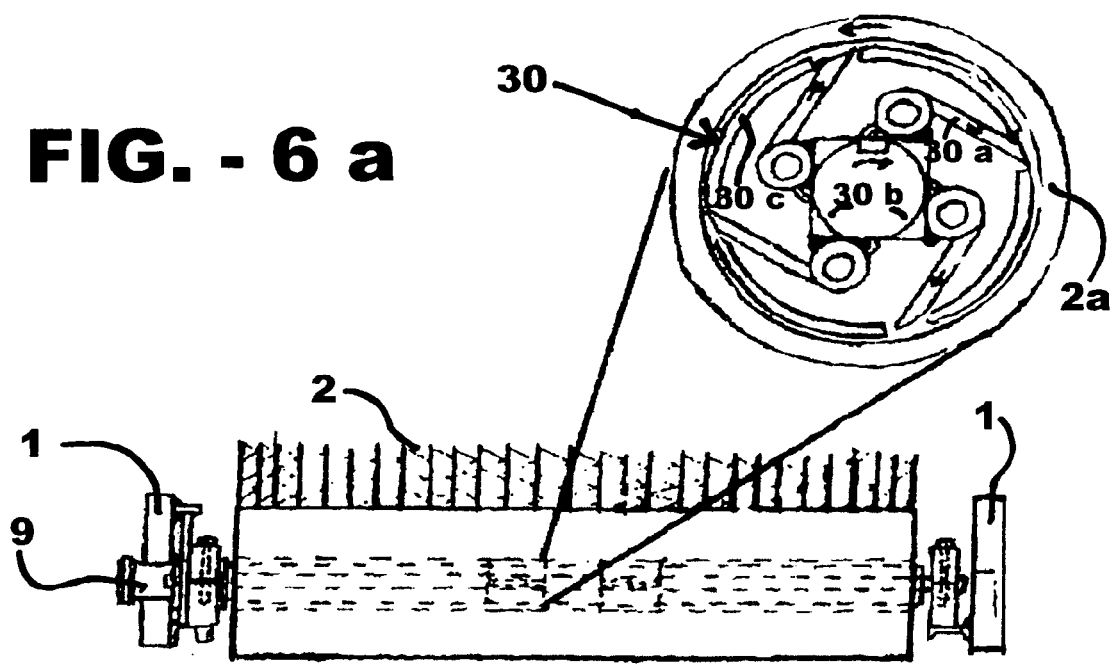
FIG. 6(a) is an illustration of the net or wrap, with the anti-slip mechanism shown in the close-up view.
Figure 6B:
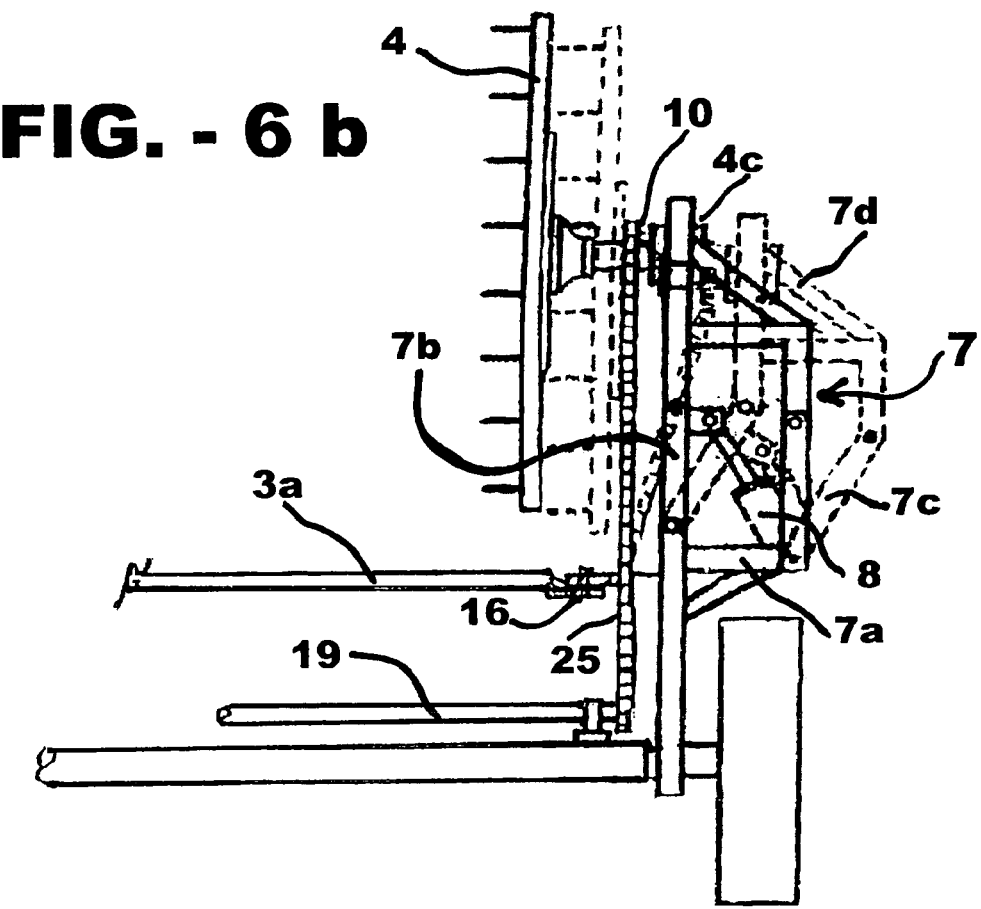
FIG. 6(b) is an illustration of the movement of the clamping panels as cylinders which control the first actuation means retract and extend.

Further features of the invention are seen in FIGS. 5 and 6b. As shown, two gates 6 are provided at the exit end of the frame 1, each pivoted to a side of the hollow upstanding end 1a of this frame and which are urged into closed position by springs 11. FIG. 5 also shows locking pins 13 extending down from lower, outer portions of gates 6 and which engage in openings in the displaceable floor portion 3a when this floor portion is in its raised position, i.e. level with the fixed portion of the floor 3. These locking pins 13 are released when the floor portion descends.

The clamping panels 4 are each in the form of a generally square plate with inwardly extending spikes S suitable for penetrating, grasping and holding the sides of a bundle of hay bales. The panels are mounted on platens 4a each held by a shaft 4b, these shafts being rotatable in bearings 4c. As best seen in FIG. 6b, the bearings 4c are held at upper ends of triangulated movable supports 7d forming the upper part of an assembly 7. Each assembly 7 has pairs of parallel links 7b, 7c, having lower ends pivoted respectively on a side of frame 1 and on the outer end of supports 7a projecting outwardly from the frame. These assemblies 7 maintain the bearings 4c horizontal as they are moved inwardly and outwardly by hydraulic cylinders 8 connected between the outer portions of supports 7a and upper ends of links 7b.

The means for rotating the panels 4 are shown in FIG. 5 as including a rotation motor 20 that drives a main transmission shaft 19 through sprockets and a chain 23. At each end of the transmission shaft 19 are additional sprockets, each of which drives a chain 25 which extends to a clamping panel sprocket 10 on shaft 4b. Motor 20, shaft 19, and the other sprockets and chains thus provide a second actuation means that can cause the clamping panels 4 to rotate. Since the single motor 20 and transmission shaft 19 drive both the clamping panels 4, the two panels 4 are always synchronized and rotate hay bundle 60 (shown in FIG. 10) at the same speed and with the same effort.

A pair of steel cables (not shown) is attached at one end to a movable part of support 7d, and the other end to each of two latches 16 that restrain the displaceable floor portion 3a from dropping. The cables are arranged so that as the movable supports 7 are pushed inwardly by the cylinders 8 these cables are drawn so that they pull on the latches 16, unlocking the displaceable portion 3a of the floor 3.

Figure 7:
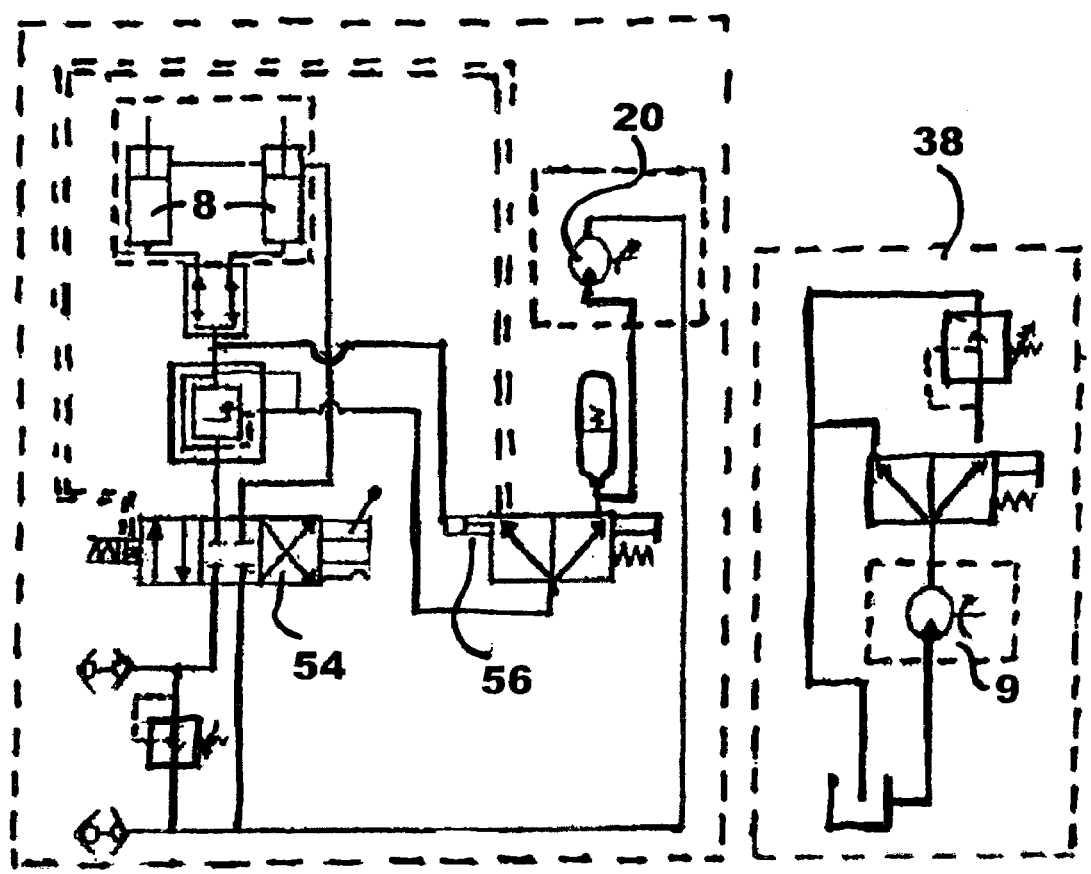
FIG. 7 is a schematic of the hydraulic circuit providing power for the operation shown in FIGS. 11 and 12.

Further features of the apparatus shown in FIGS. 5, 6a and 7 will be described in relation to operation of the apparatus.

Figure 8:
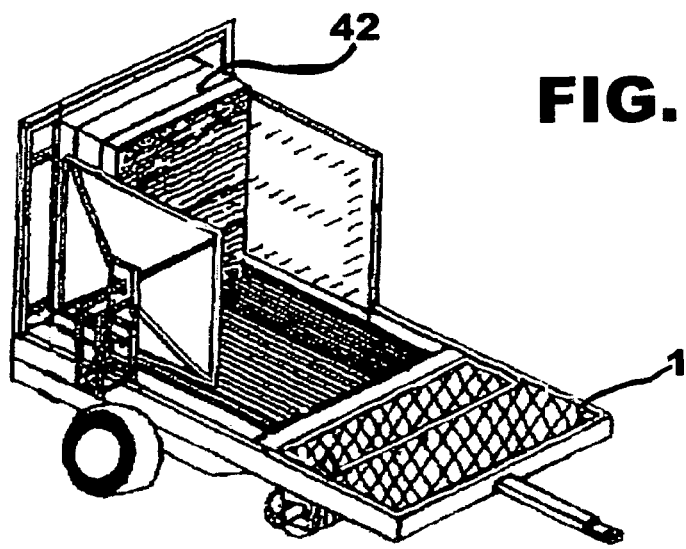
FIG. 8 through FIG. 12 are perspective views of the machine sequentially demonstrating the operation of the hay bale bundling machine from the first column of bales being stacked to the ejection of the wrapped package.
Figure 9:
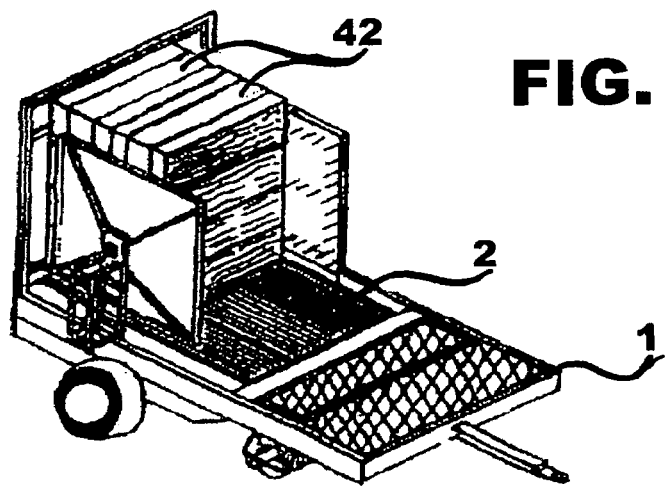
Figure 10:
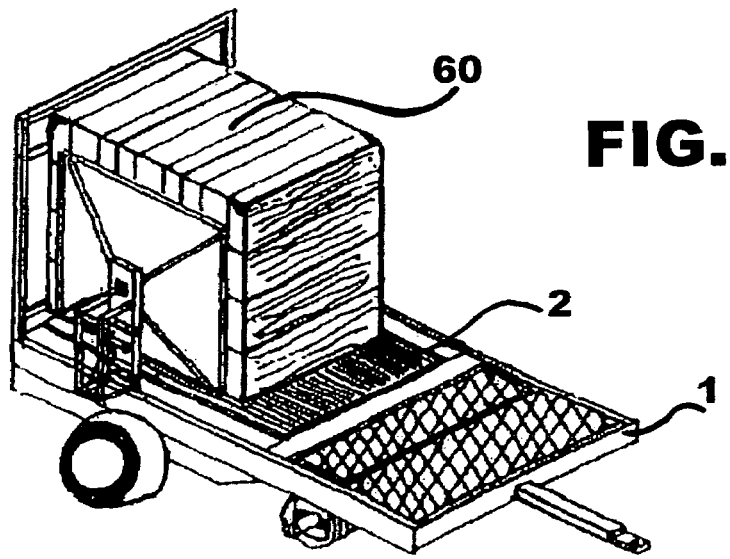
Figure 11:
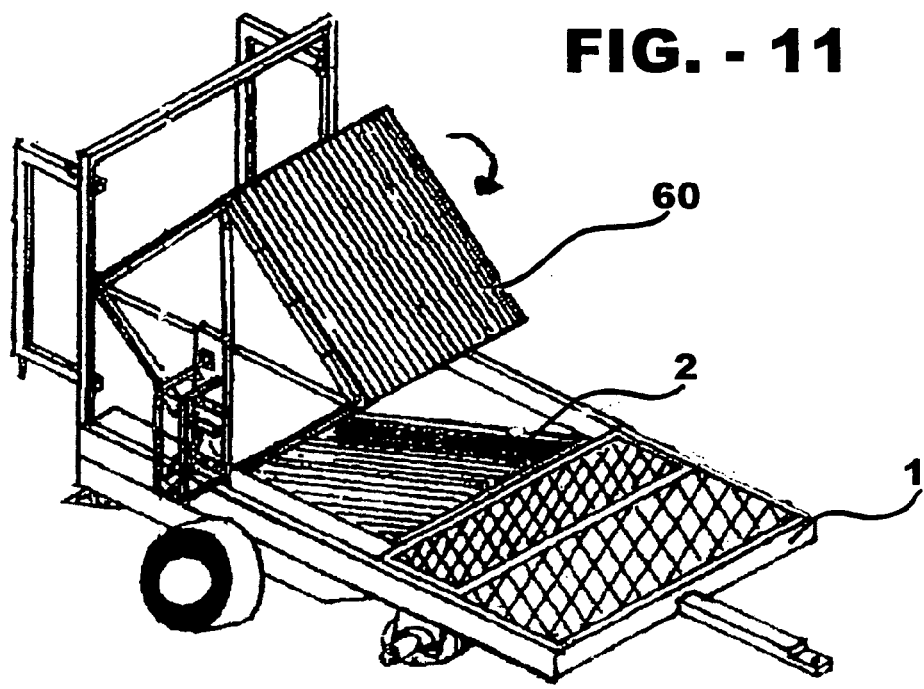

In operation, an operator may manually stack the bales one by one to form the first stack 42 of four bales 42, as shown in FIG. 8. The first stack is placed against the gates 6 located on the discharge side of the machine 40. The gates 6 serve as a positioning guide and prevent the bales 42 from falling. After the first column of bales 42 is placed in position, the operator then forms the second and third stacks of four bales, as seen in FIGS. 9 and 10. Once all twelve bales 42 are in place forming a hay bale bundle 60, the operator of the machine 40 activates the directional control valve 54 (FIG. 7) to start the wrapping cycle.

Hydraulic power is provided from the tractor to the machine 40 through hydraulic lines (not shown). Quick connect couplings are used to connect the hydraulic lines from the tractor to the baler and from the baler to the machine 40. Only a small amount of hydraulic power is required to operate the machine 40. A flow of 8 gpm with a pressure of 1500 psi would normally be more than sufficient.

When the directional valve 54 is activated, the flow of oil is directed to the sequence valve 55. In the first sequence the flow is directed to the clamping cylinders 8 and to the pilot cylinder 56 attached to the selector valve 32 which will activate the directional control valve spool to put the flow in stand-by for the rotation motor 20. As seen in FIG. 6b, as the cylinders 8 extend the movable supports 7d are pushed inwardly. The cylinders 8 continue to extend until the clamping panels 4 have compressed the bundle of bales 60 with enough force (typically achieved at around 1000 psi in the cylinders) so that the package of bales 60 will not drop when the displaceable portion 3a of the floor 3 drops down.

When the clamping cylinders 8 have reached their peak pressure, the flow of oil is re-directed from the sequence valve 55 to the hydraulic motor 20 to start the rotation of the package 60.

Figure 2:
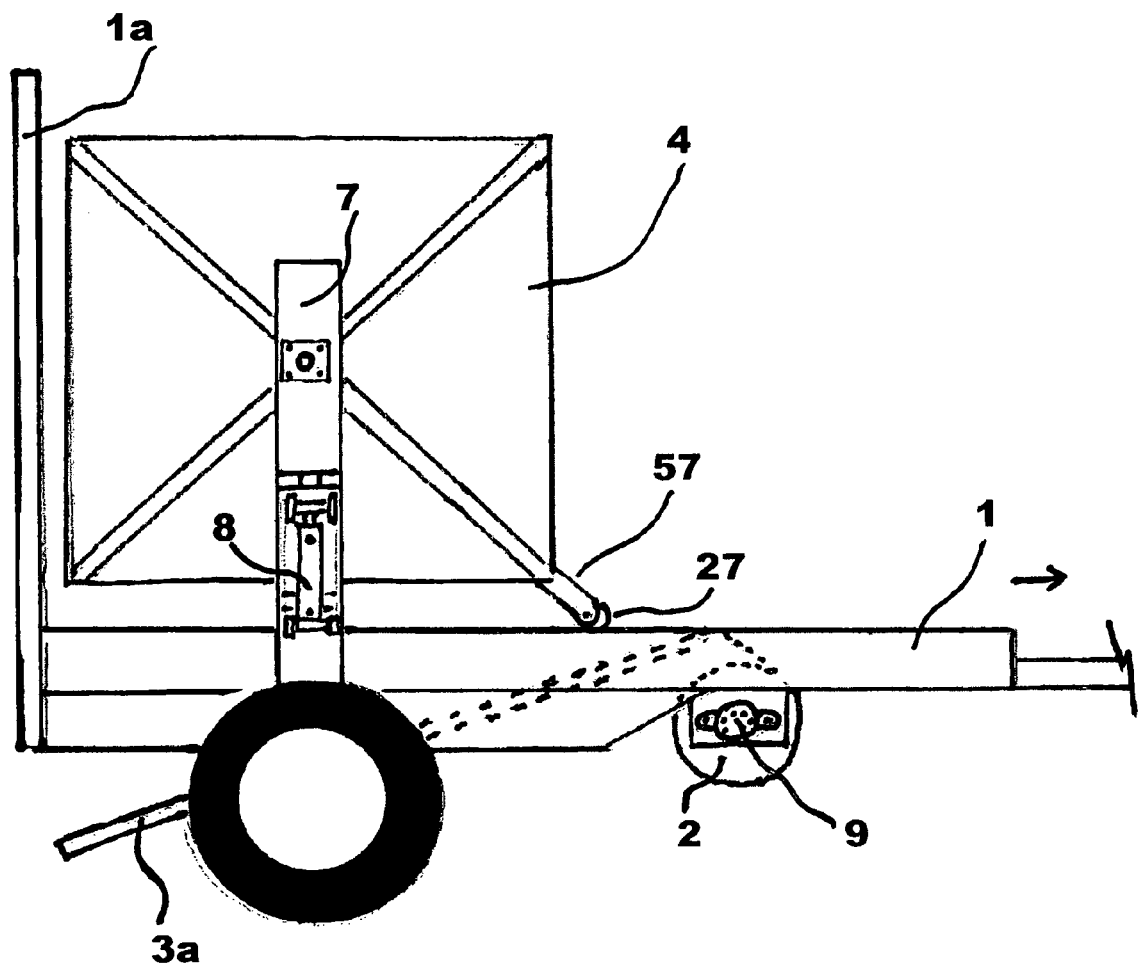
FIG. 2 is a right side elevation view of the machine shown in FIG. 1, with an adjustable portion of the floor in the lowered position.
Figure 3:
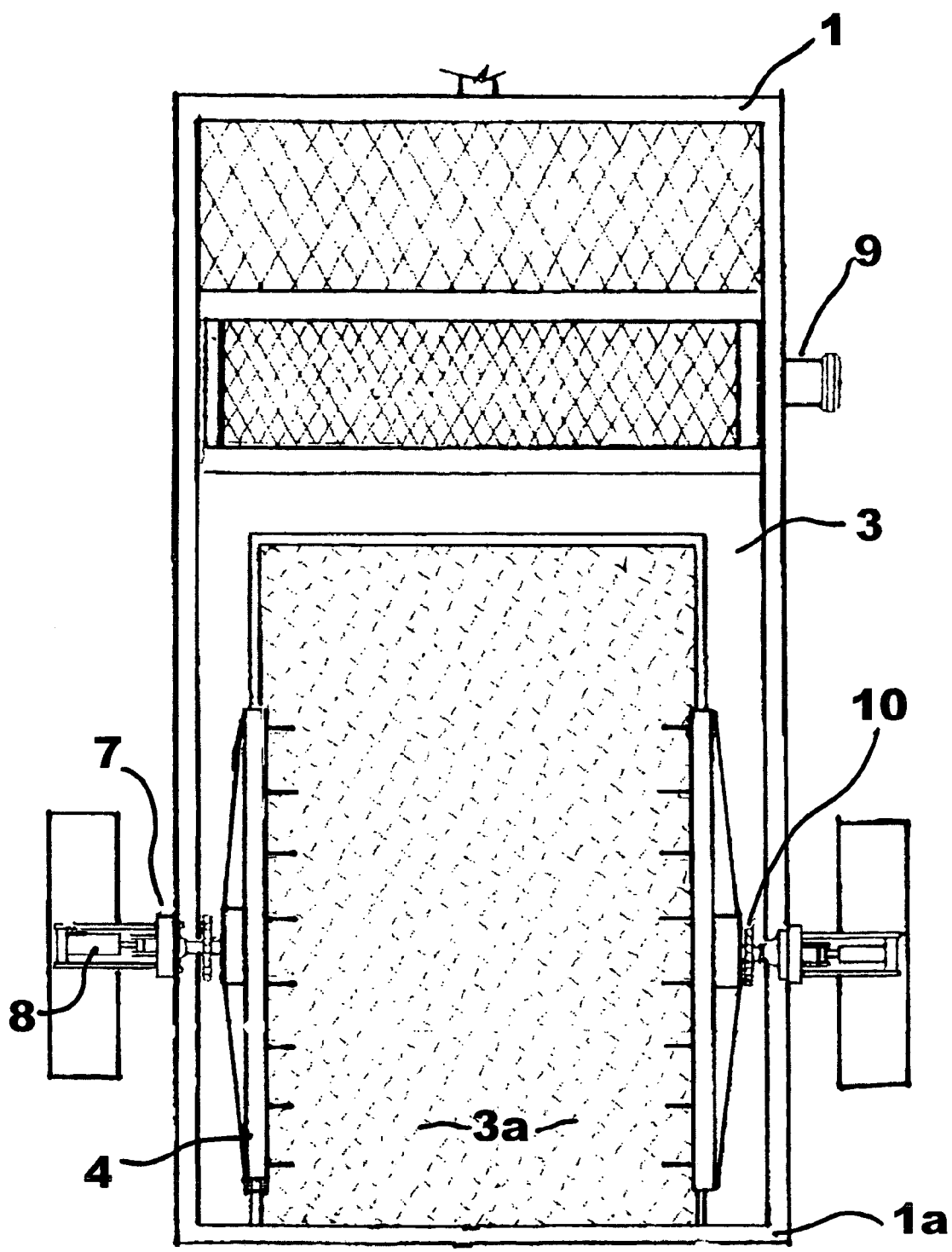
FIG. 3 is a top view of the machine shown in FIG. 1.
Figure 4:
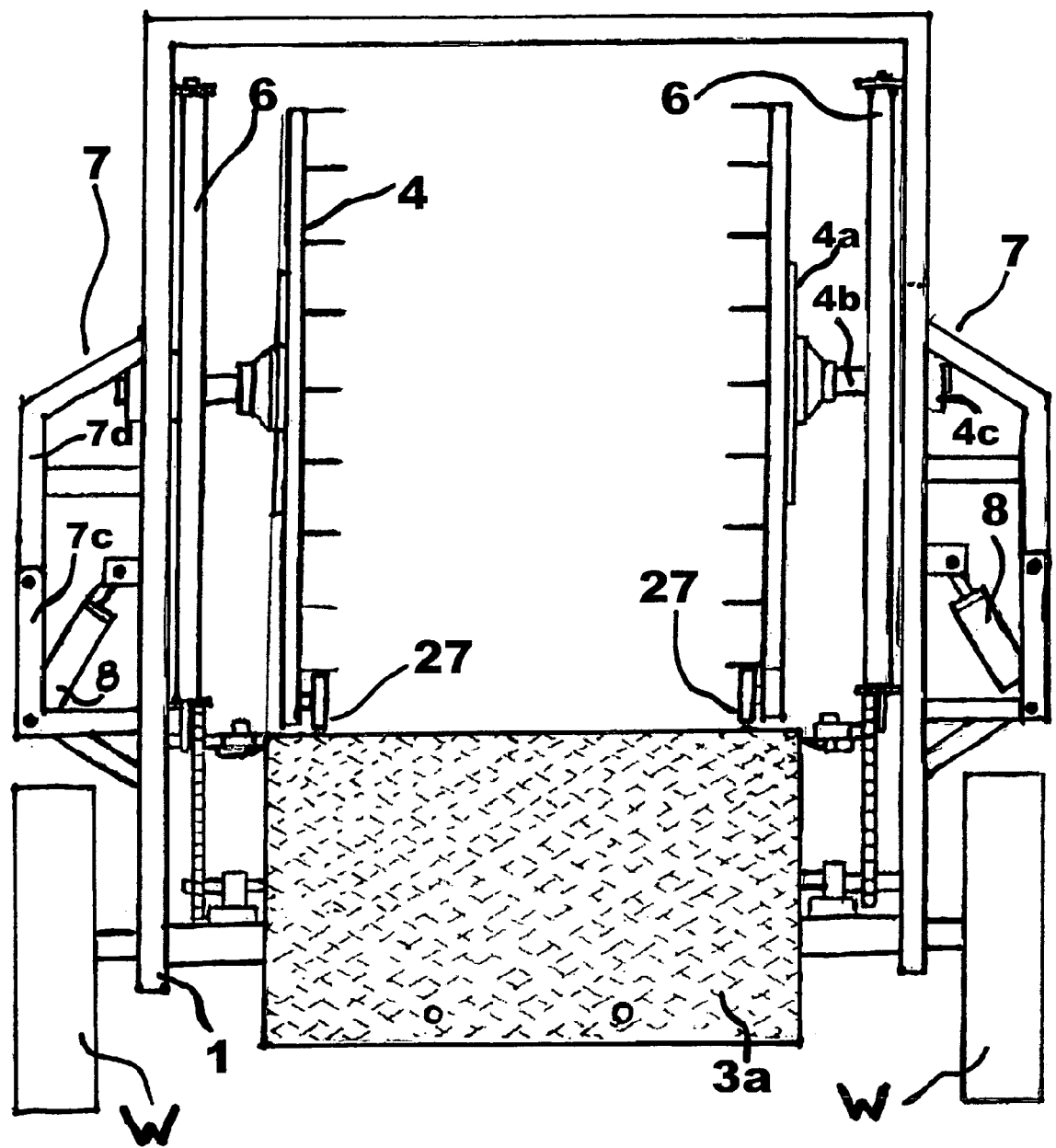
FIG. 4 is a rear plan view of the machine shown in FIG. 2, with the gates in the open position.

As the clamping panels 4 begin to rotate, the rollers 27, seen in FIG. 2 as being attached to arms 57 extending from the lower front corners of the clamping panels 4, push the displaceable portion 3a of the floor 3 down, rotating it about its hinges against the force of spring means 26. Once this displaceable portion 3a of the floor 3 has been lowered, the locking pins 13 extending downwardly from the gates 6 are freed from the floor portion 3a, allowing the gates 6 to open and giving full clearance for the package of bales 60 to rotate. Once the bundle of bales 60 starts to rotate, the corner of the bundle 60 hooks the underlying layer of wrapping material 2 which is dispensed from a reel having its own control means including hydraulic pump 9; details of the reel R and associated parts being shown in FIG. 6a and being further described below. As the displaceable portion 3a of the floor reaches its maximum downward position, it is temporarily held in place by two hooks 17 that are engaged by two rotating drums 22 carried on the transmission shaft 19, as seen in FIG. 5. These hooks 17 remain engaged in that position until the end of the rotation cycle.

In the first revolution of the bundle of bales 60, no tension is applied to the wrapping material 2, so as to ensure that such material 2 does not to lose its grip on the hay bundle 60. After the first revolution is completed, however, tension is applied to the wrapping material 2 by a self-contained hydraulic system 38, seen in FIG. 7, and which includes the pump 9. The package of bales 60 will then make another two and ¾ revolutions before coming to the repositioning cycle.

As seen in FIG. 5, as the main transmission shaft 19 rotates, it drives another small counter shaft 24a by way of sprockets and a chain 24, with a 4-1 reduction ratio. The effect is that the main transmission shaft 19 will rotate four times before a rotation count cam 15, connected to the counter shaft, makes one revolution. Once the package of bales 60 has made 3 and ¾ revolutions, the rotation count cam 15 activates a selector valve 32 and stops the flow to the hydraulic motor 20. The hooks 17 are then released from the drums 22 and the displaceable floor portion 3a rises back up, to the extent permitted by the presence of the bundled hay 60, under the influence of the spring means 26 attached to the frame 1. A shock absorber could also optionally be used to control the rate of lift of the displaceable floor portion 3a. A hydraulic accumulator then discharges its pressure to the motor 20 and completes the ¼ revolution of the package of bales 60, to reposition the clamping panels 4 at their starting rotational orientation. The rotation count cam 15 is also thereby repositioned to its starting point When the rotation count cam 15 activates the selector valve 32, the flow of oil is then redirected to a pilot cylinder 56 attached to the directional control valve 54 and actuates the directional control valve spool to reverse the flow of hydraulic fluid to the clamping cylinders 8. As the clamping cylinders 8 retract each one pulls the middle section of the movable supports 7d, which in turn withdraw the clamping panels 4 and let the wrapped bundle of bales 60 drop towards the floor 3.

Figure 12:
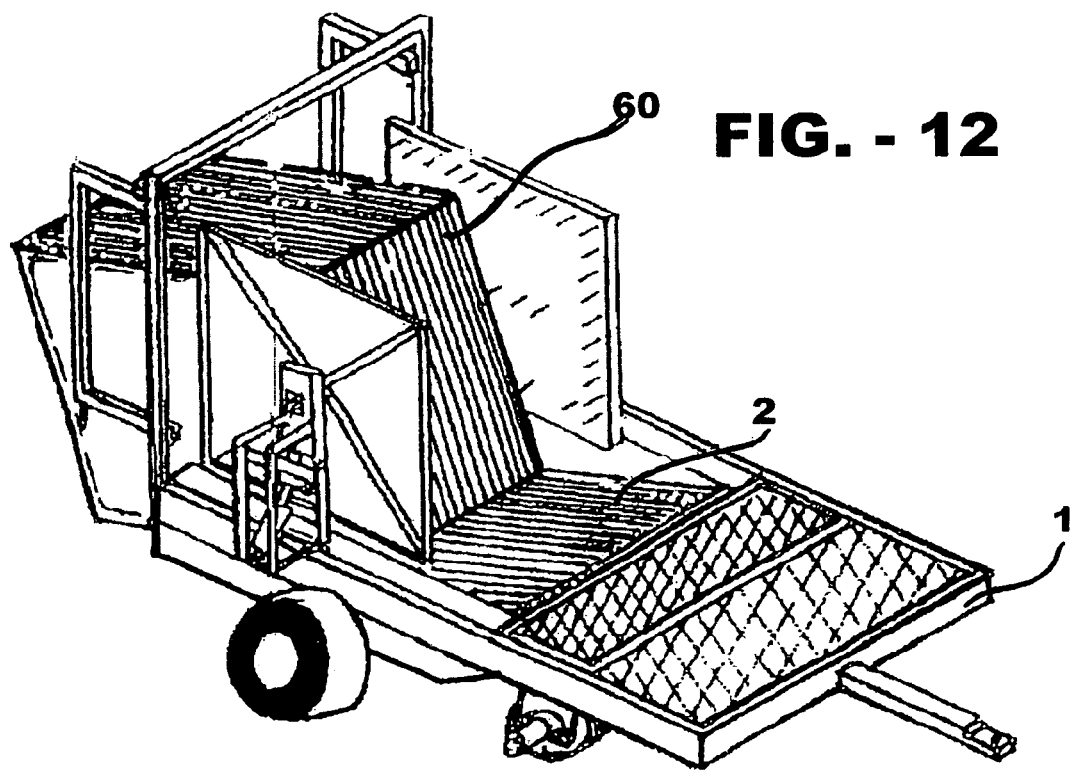
Figure 13:
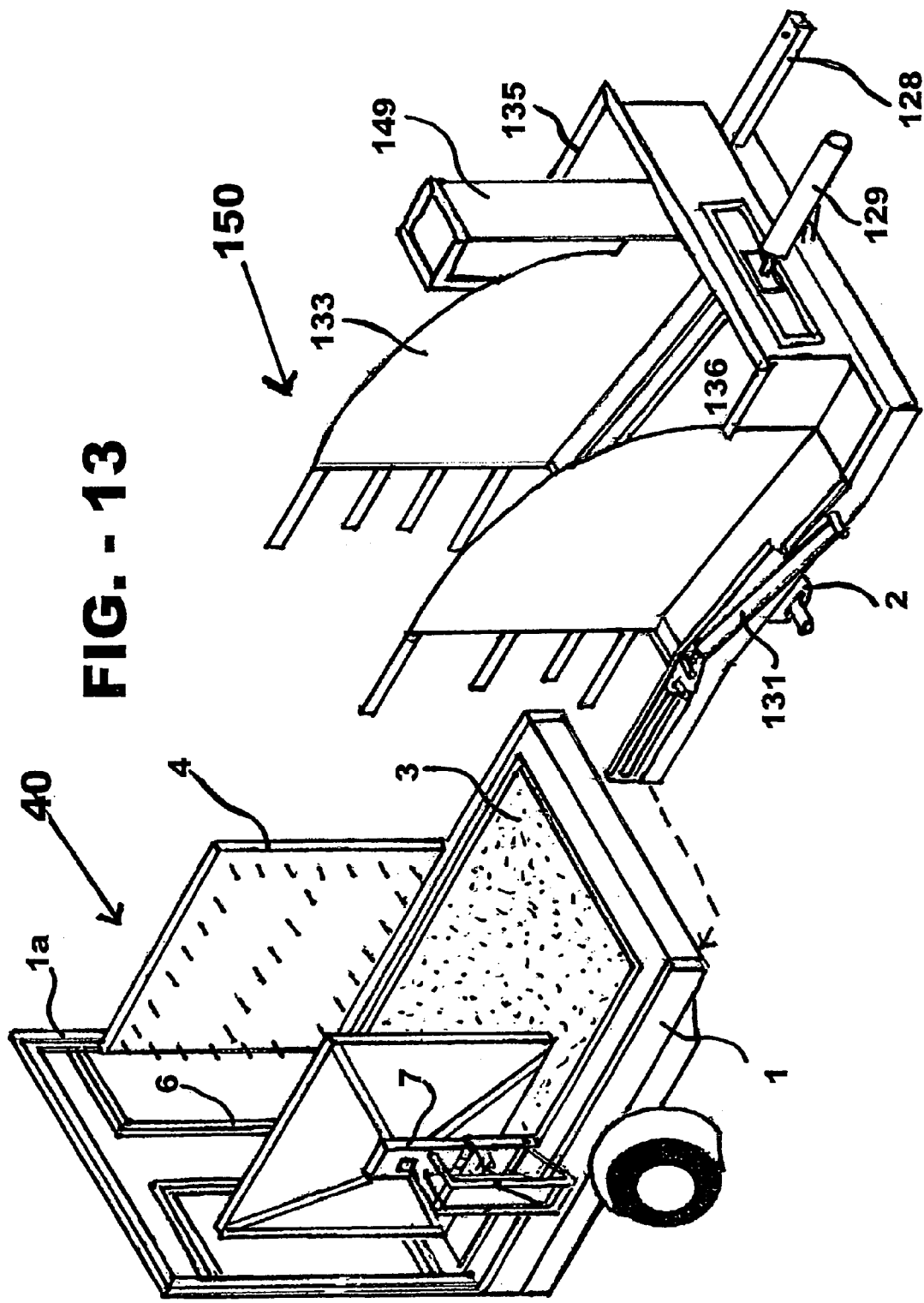
FIG. 13 is a perspective view of an automatic bale-stacking machine along with the machine from FIG. 1.

When the wrapped package of bales 60 is released by the clamping panels it is heavy enough to force displaceable portion 3a of the floor 3 into the lowered position against the force of spring means 26, the latches 16 still being disengaged, so that the floor portion 3a is then angled to form a ramp which allows the bundled package 60 of bales to slowly slide out of the machine 40, as seen in FIG. 12. Once the package 60 has reached the end of displaceable floor portion 3a, a blade (not shown) at the end of the floor portion 3a cuts the wrapping material 2. After the package of bales 60 has been ejected, the gates 6 are closed by springs 11, the floor portion 3a is move upwards by springs 26 and upon reaching its upward position it locks itself by operation of latches 16, once the articulated arms 7 are fully retracted.

The net tensioning mechanism 38 (indicated in FIG. 7) mentioned above is better understood with reference to FIGS. 5 and 6a.

Looking firstly at FIG. 6a, as the wrapping material 2 is being pulled by the package of bales 60, it unrolls from a roll R. An anti-slip mechanism 30 includes a circular metal tubing 30c that is inserted in the roll of wrapping material 2, and a shaft 30b that runs parallel inside the metal tubing 30c and has the net tensioning pump 9 connected to it. Two sets of four pivoting blades 30a are attached around the shaft 30b at each end, which shaft extends along the length of the metal tubing 30c. The blades 30a are generally positioned at 90 degrees from each other. When the tensioning pump 9 experiences a back pressure it restricts the shaft 30b from rotating freely and thus pushes the rotating blades 30a outwardly through slots in the metal tubing 30c, so that they extend outwardly away from the metal tubing 30c and into the cardboard tubing 2a of the roll R of wrapping material 2. This prevents the roll of wrapping material from slipping easily and develops tension in the wrapping material 2. The more tension is applied to the wrapping material 2 by the tensioning pump 9, the more the pivoting blades 30a dig into the cardboard tubing 2a and a greater tension is provided in the wrapping material 2 enveloping the hay bundle 60.

When the net tensioning pump 9 is rotating, it pumps oil from the reservoir to a selector valve, and when no tension is required the flow is directed back to the reservoir. This selector valve is shown at 14 in FIG. 5, and as shown it is positioned to be acted upon by a tensioning cam 18 which is mounted on the same shaft 24a which carries the cam 15. When the selector valve 14 is actuated by the tensioning cam 18, the flow of fluid being pumped by the pump 9 is directed to an adjustable relief valve which restricts the flow and creates pressure on the tensioning pump 9, which acts as a brake and forces it to slow down. An appropriate setting for the relief valve is at 700 psi.

As noted, the tensioning cam 18 is mounted on the same counter shaft 24a as also carries the rotation cam 15, and thus has a ratio of 1-4 with respect to the main transmission shaft 19. The cam 18 is arranged so that, after the first revolution of the package of bales 60, the selector valve 14 is actuated by the tensioning cam 18 and redirects the flow from pump 9 towards a relief valve and applies the braking action to the reel R.

Figure 14:
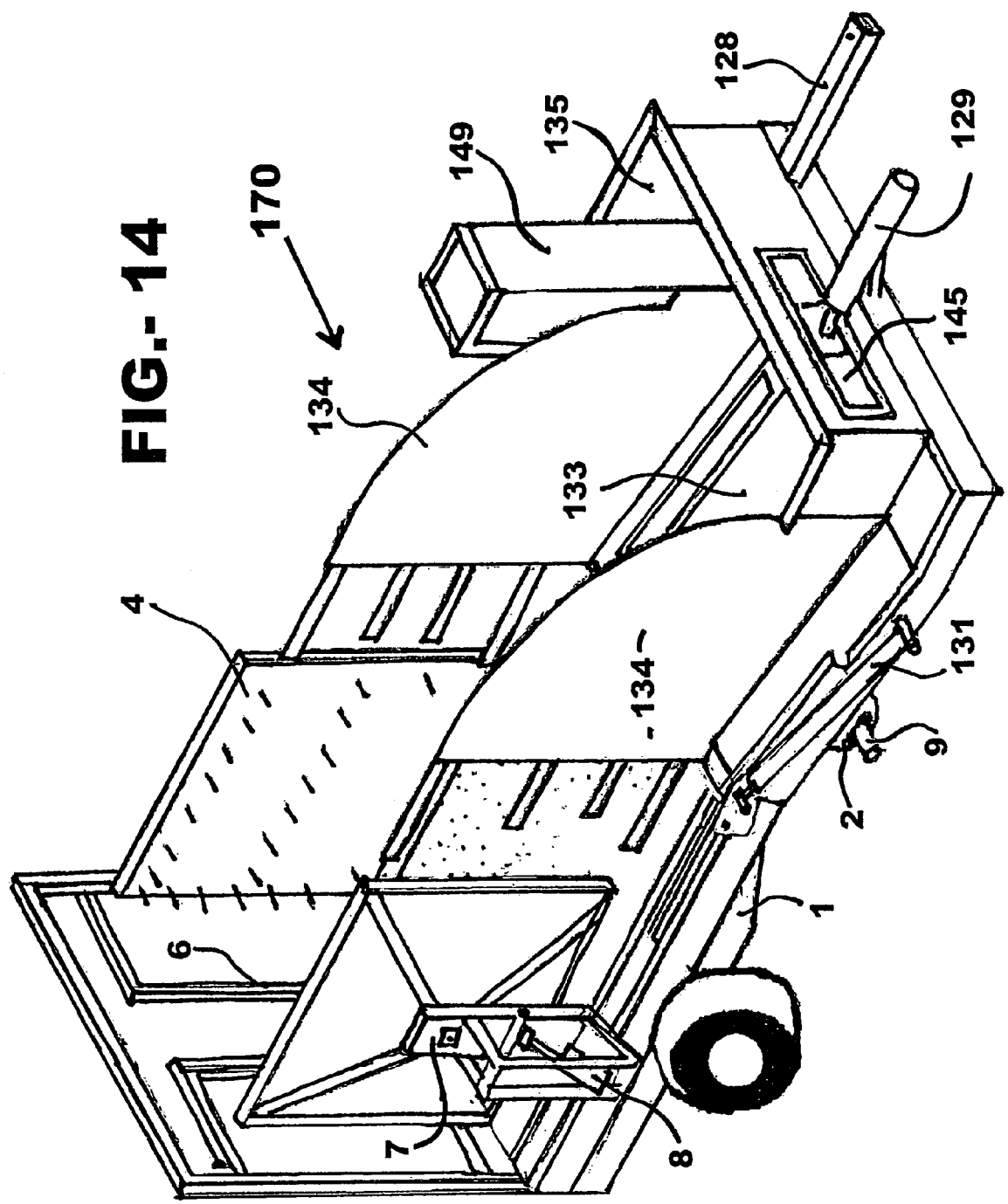
FIG. 14 is a perspective view of the two machines from FIG. 13 assembled together.
Figure 15:
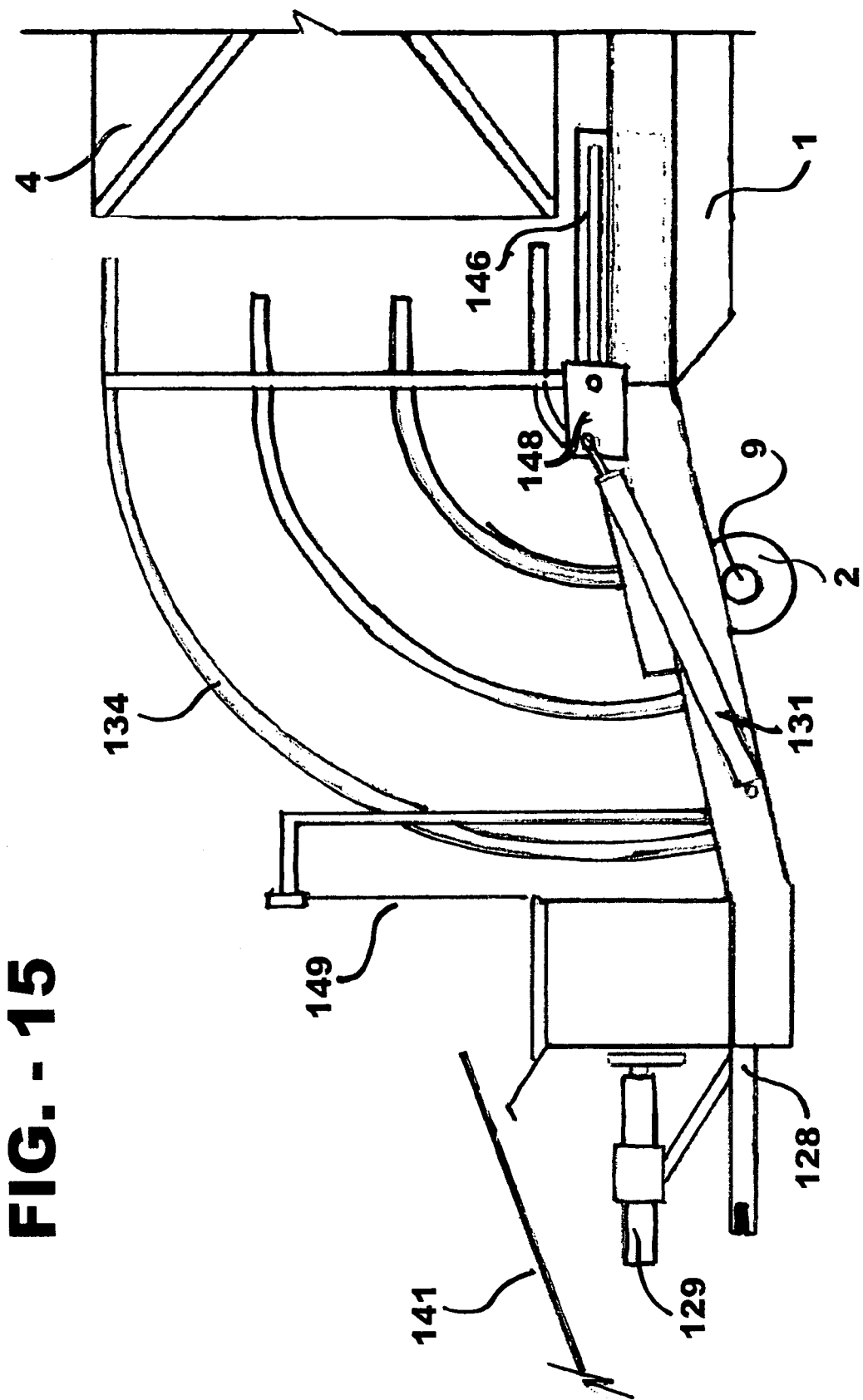
FIG. 15 is a left side view of the automatic bale stacking mechanism from FIG. 14.

As mentioned above, the individual bales may be stacked into a cube manually or, as another option, an automatic bale-stacking machine 150, shown in FIGS. 13-31 may be provided. FIG. 14 shows the bale-stacking machine 150 attached to the wrapping machine 40 to create a fully automatic wrapping machine 170.

Similar to the wrapping machine 40 mentioned above, a draft tongue 128 is welded to the bale-stacking machine 150, so when it is part of the fully automatic wrapping machine 170 it may be connected to a baler and a tractor (not shown), for movement throughout a field. As with the wrapping machine 40, hydraulic power from the tractor may operate the hydraulic functions shown in FIG. 17 of the bale-stacking machine 150. Further particulars of the apparatus will be explained in relation to their operation.

Figure 17:
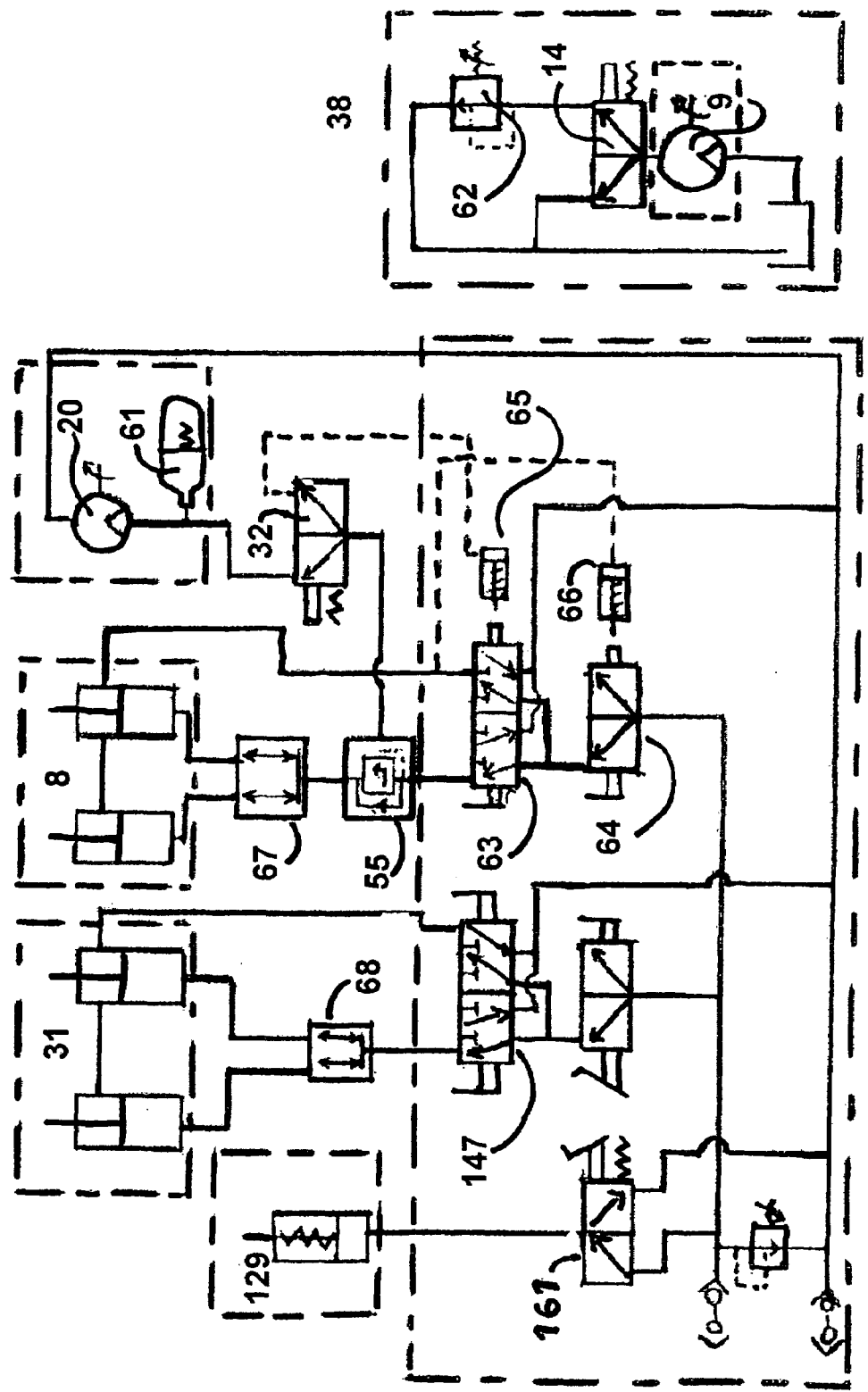
FIG. 17 is a schematic of the hydraulic system providing power for the operations shown in FIGS. 18 to FIG. 31.

In FIG. 17, the following hydraulic components are present:
61 Accumulator
62 Relief valve (net tensioning)
63 Selector valve (2 position-6 way) extend and retracts cyls.8
64 Selector valve (2 Position-3 way) On & off for Cylinders 8
65 Pilot cylinder (activates Selector valve # 63 to retract cylinders #8.)
66 Pilot cylinder (activates selector valve # 64)
67 Flow divider (for cylinders #8, to move at same speed.)
68 flow divider (for cylinders # 131)

Figure 18:
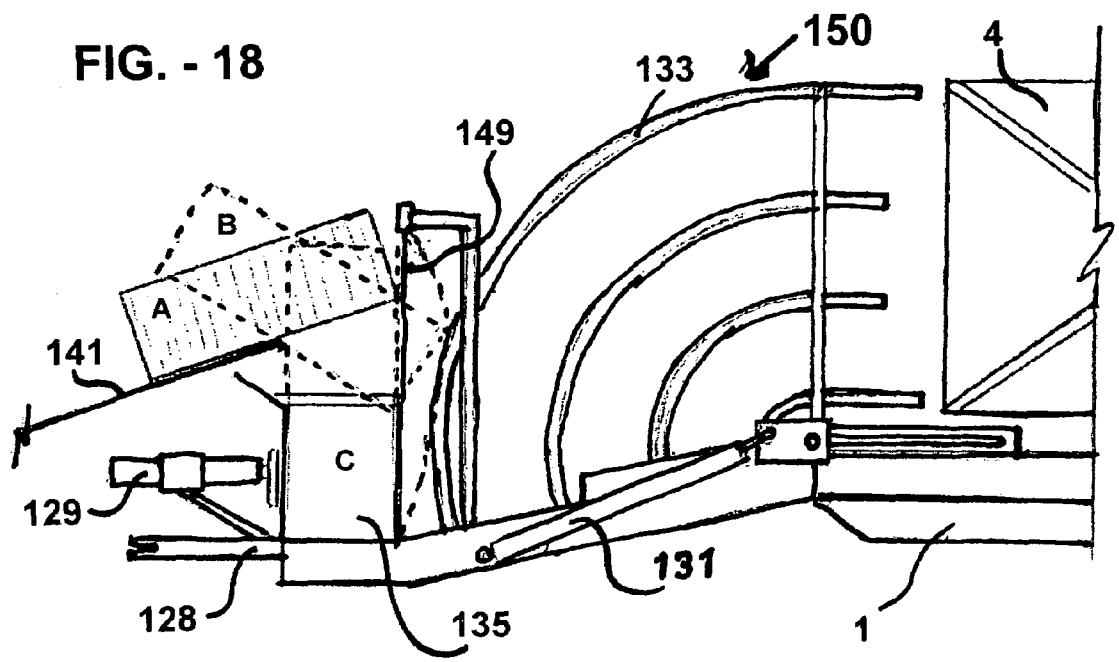
FIG. 18 is a side view of a bale entering the automatic bale-stacking machine.

Starting at FIG. 18, the advancement of a hay bale 42 progressing through its initial entry into the bale-stacking machine 150 is shown. As the bale 42 is ejected from the baler, it is pushed along a ramp 141 attached to the baler by a subsequent bale also being ejected from the baler. This is shown in FIG. 18, with the hay bale 42 in initial position A. As the bale 42 reaches the end of the ramp 141, the bale pivots downward under gravity into position B and strikes against a suspended barrier 149 which forms a flexible front side of a receiving chute 135 which is off-set to one side of the entry end of the machine 150. This barrier 149 is anchored at its top but is trapped at its bottom so as to permit only vertical sliding. The barrier 149 flexes to give way to the bale 42, forcing it into the receiving chute 135 in a vertical orientation shown as position C.

Figure 19:
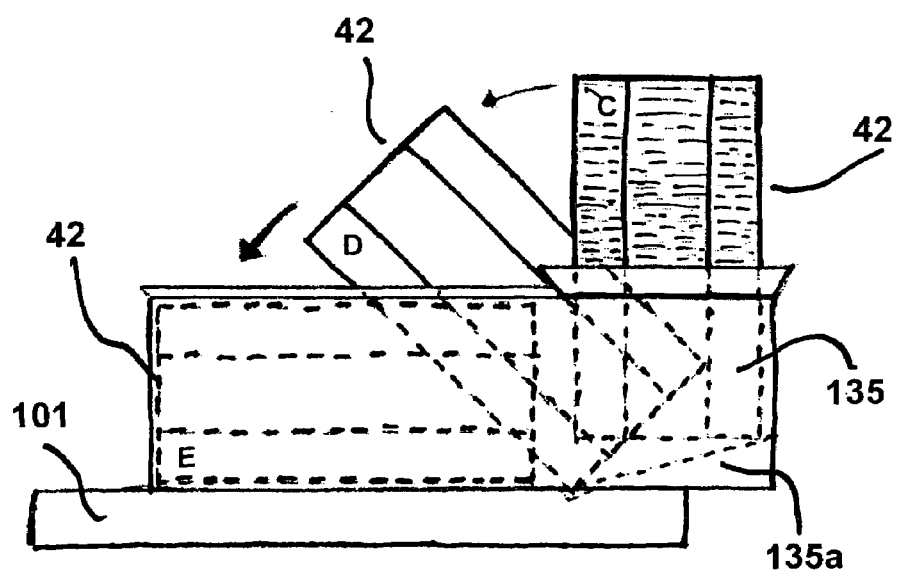
FIG. 19 is a side view of the bale being pivoted into a horizontal position in the automatic bale-stacking machine.

As shown in FIG. 19, the bottom 135*a* of the receiving chute 135 is elevated up from the floor 101 at the input end of the stacker, sloping down to floor 101 at an angle, forcing the bale 42 to pivot into a horizontal orientation as shown as successive positions C-D-E in FIG. 19. By falling into horizontal position E, the bale 42 depresses pedal 143, shown in FIGS. 20 and 21, activating the selector valve 161 which in turn activates a hydraulic pusher cylinder 129 attached to the rear end of the machine 150.

Figure 22:
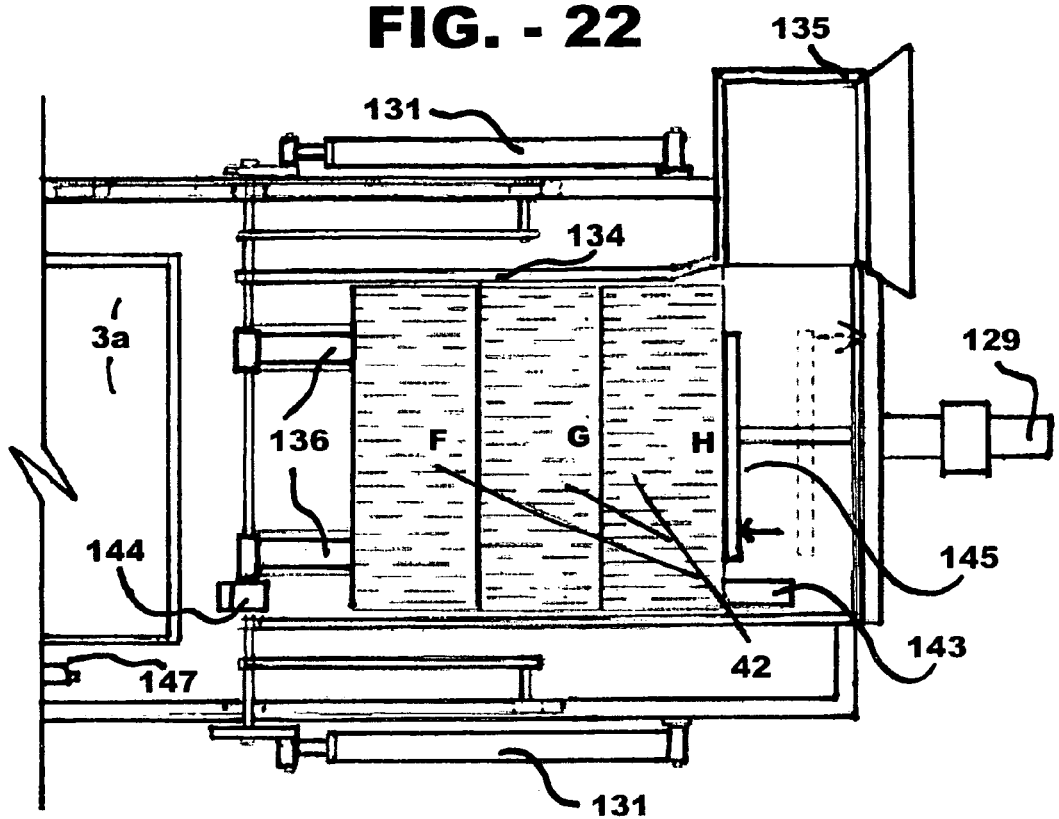
Figure 23:
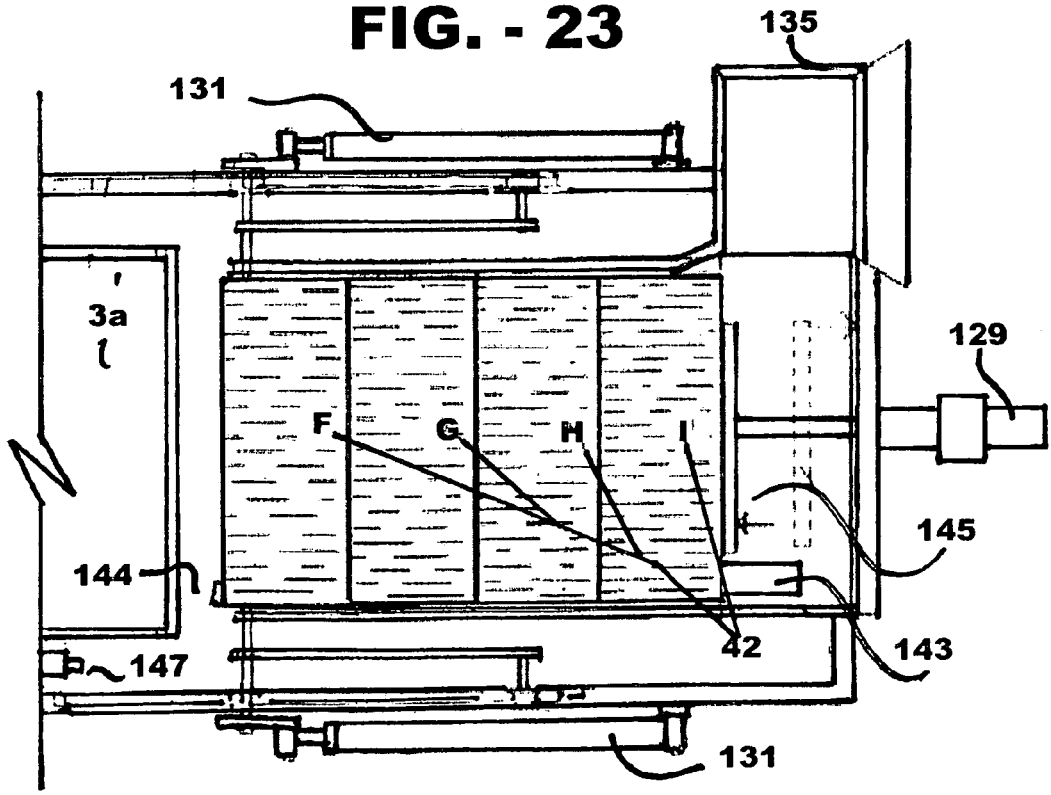
Figure 24:
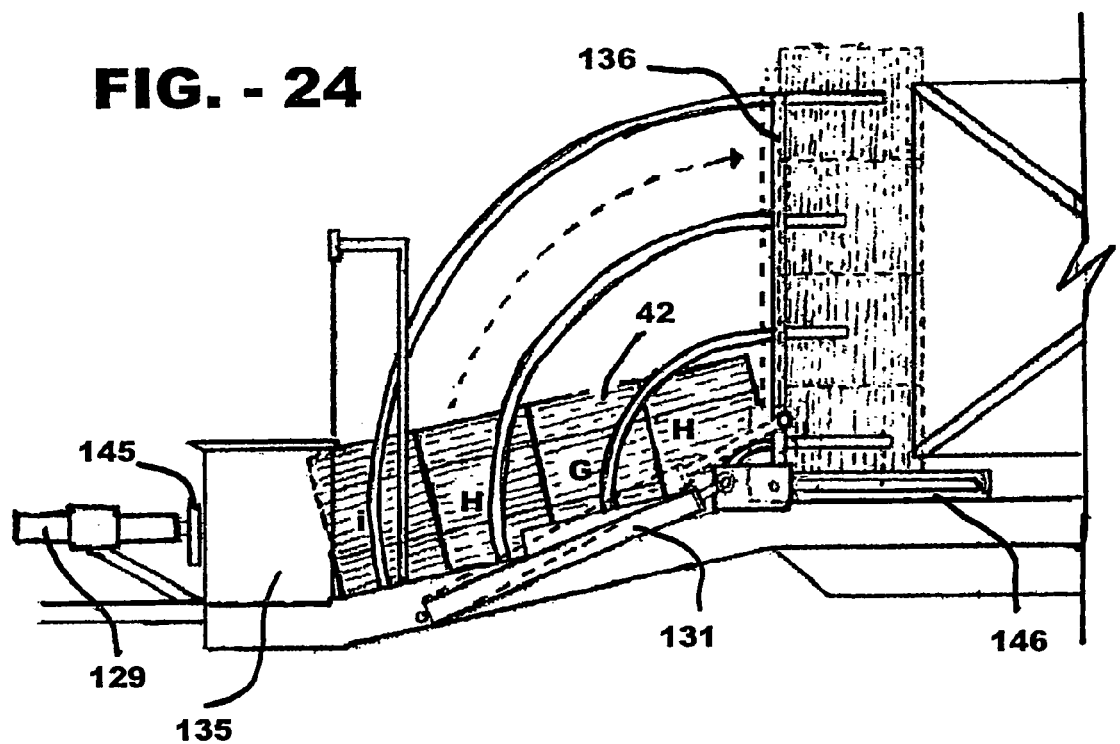
FIG. 24 through FIG. 29 are side views demonstrating the operation of the automatic bale-stacking machine from the four hay bales being rotated into an upright position through to the full group of hay bales being assembled.

As can be seen in FIG. 20, as the pusher cylinder 129 extends, bale pusher plate 145 advances the bale 42 forward, into position F. Once the bale 42 comes off the pedal 143, hydraulic flow is redirected in the selector valve to cause or allow the pusher cylinder 129 to retract, with the help of a spring. This above process, from FIG. 18 through to FIG. 20 is repeated three more times, as seen in FIGS. 21-23. Once the fourth bale has been pushed into the bale-positioning chamber 133 between the panels 134, which are aligned with clamping panels 4 as seen in FIG. 14, the first bale has been advanced so that it activates a lever 144 (FIG. 16) which will start the positioning cycle of the row of four bales 42.

Figure 16:
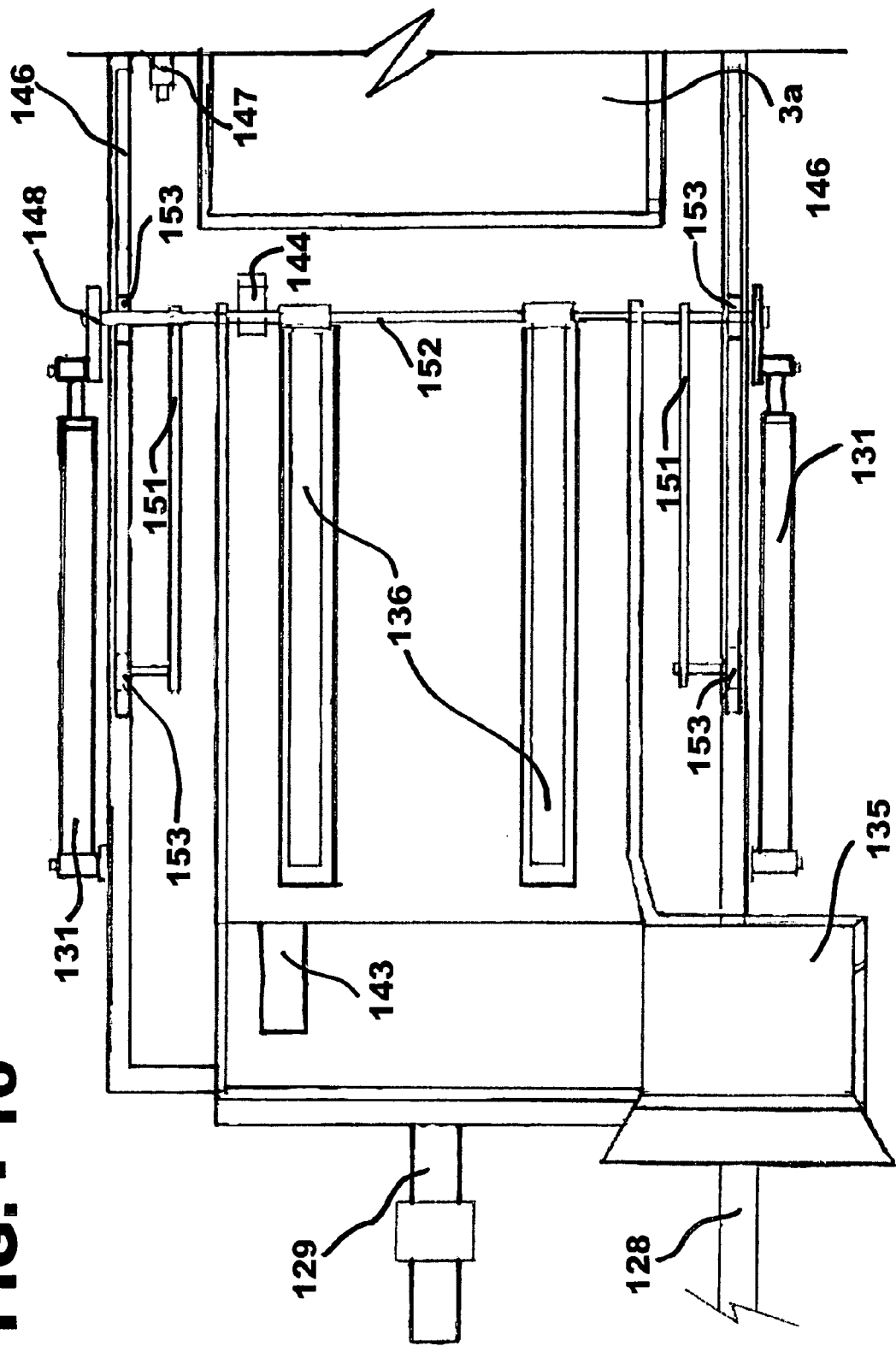
FIG. 16 is a top view of the automatic bale-stacking mechanism from FIG. 14.

As shown in FIG. 16, two lifting forks 136 extend at 90 degrees from a shaft 152. At opposite ends of the shaft 152 are linking plates 148 to which a pair of hydraulic cylinders 131 are attached. Two stabilizing members 151, with two wheels 153, are mounted on the shaft 152 to make a trolley or carriage 154 which can move the shaft 152 in a generally fore-and-aft direction, the trolley being guided by two horizontal tracks 146 welded to the frame of the bale-stacking machine 150.

Figure 25:
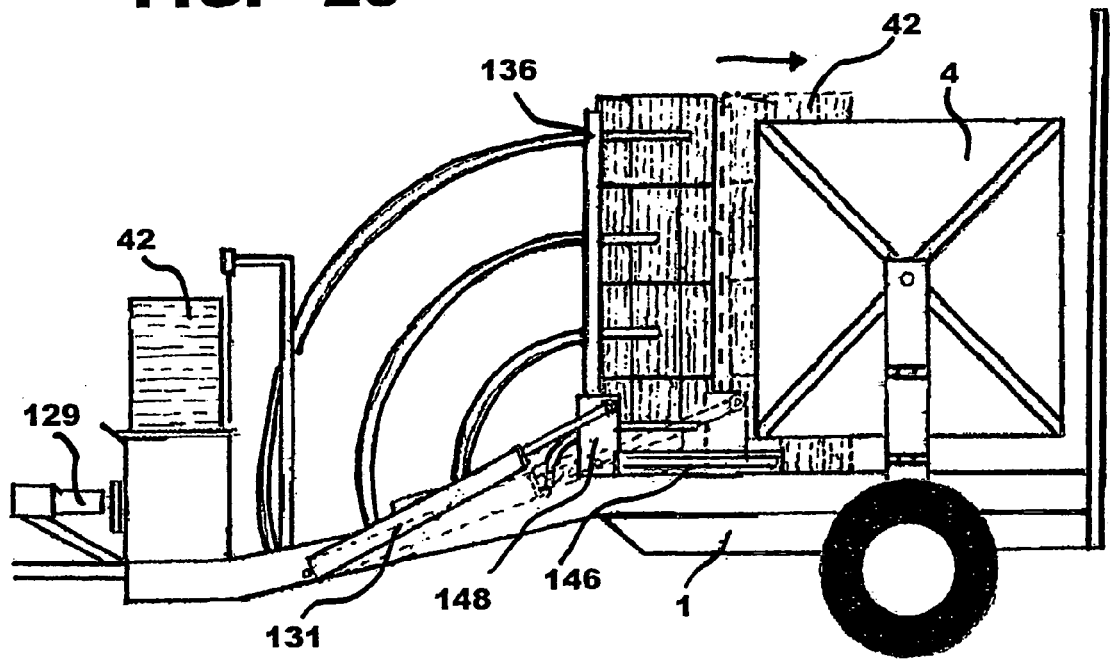

Once the bale 42 activates the lever 144, hydraulic power is transmitted to the cylinders 131. As the cylinders 131 extend, linking plates 148 rotate, swinging the forks 136 upwardly and bringing the laid-out row of bales 42 from a horizontal to a vertical position as in FIG. 24. The assembled bales, now a stack, are held in a vertical position by a stopper (not shown) that is mounted on the linking plates 148. When the bales 42 reach a vertical position the trolley 154 unlocks itself, and as the cylinders 131 continue to extend, the trolley 154 moves, advancing the vertical stack of bales 42 between front portions of the clamping panels 4, as seen in FIG. 25. The trolley advances the stacked bales 42 by a little over the width of the bale. Once located between the clamping panels 4, the stack of bales 42 is held in place with tensioning bands (not shown) attached to the clamping panels 4.

Figure 26:
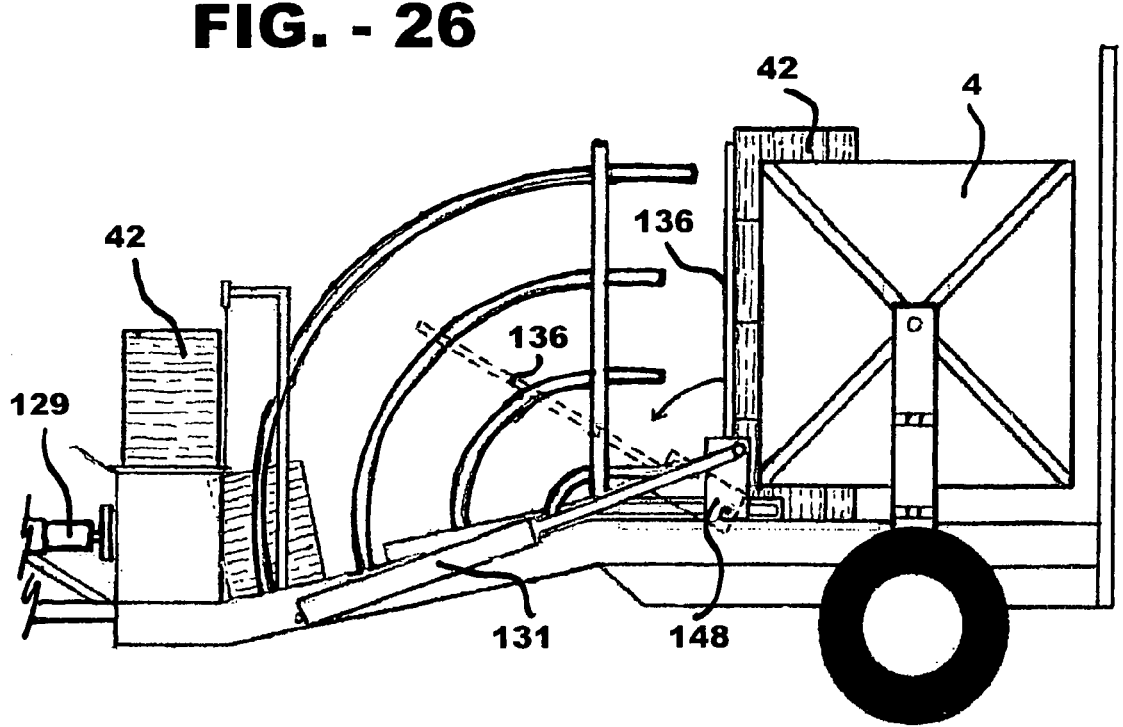
Figure 27:
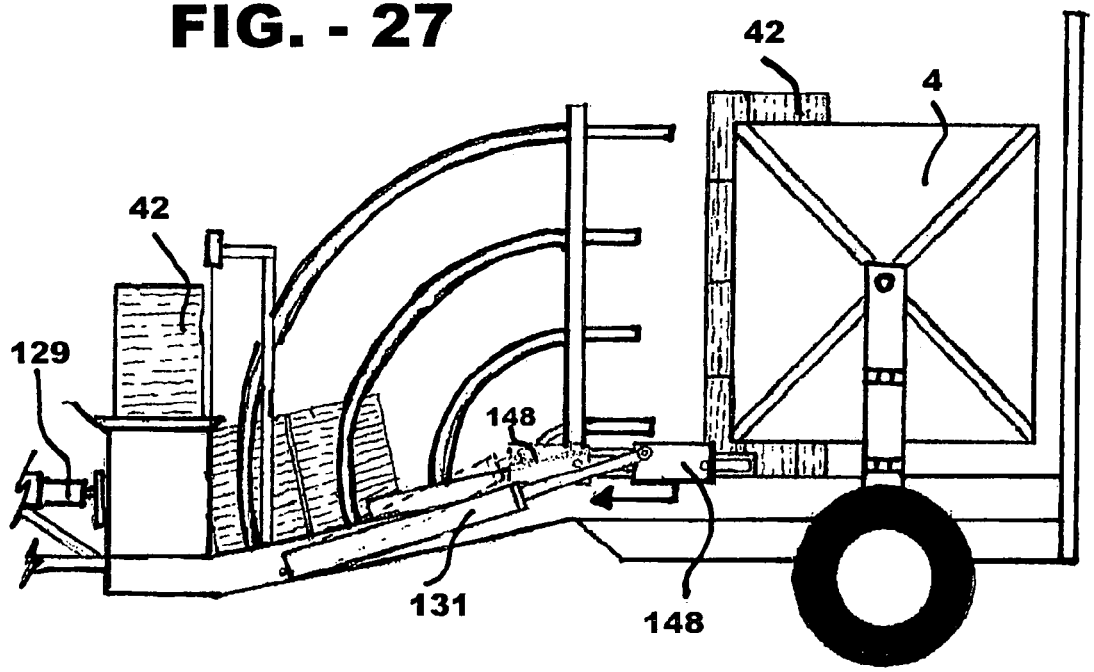

The trolley continues to move until it locks itself and activates the selector valve 147 to retract the cylinders 131. As the cylinders 131 retract, the linking plates 148 are rotated, bringing the forks 136 down (FIG. 26). Once the forks 136 are all the way down, the trolley unlocks itself and is pulled back by cylinders 131. It is important that the mechanism rotates the forks 136 down before pulling them back, so that they pass underneath the additional bales which are being simultaneously inserted into the positioning chamber 133.

Figure 28:
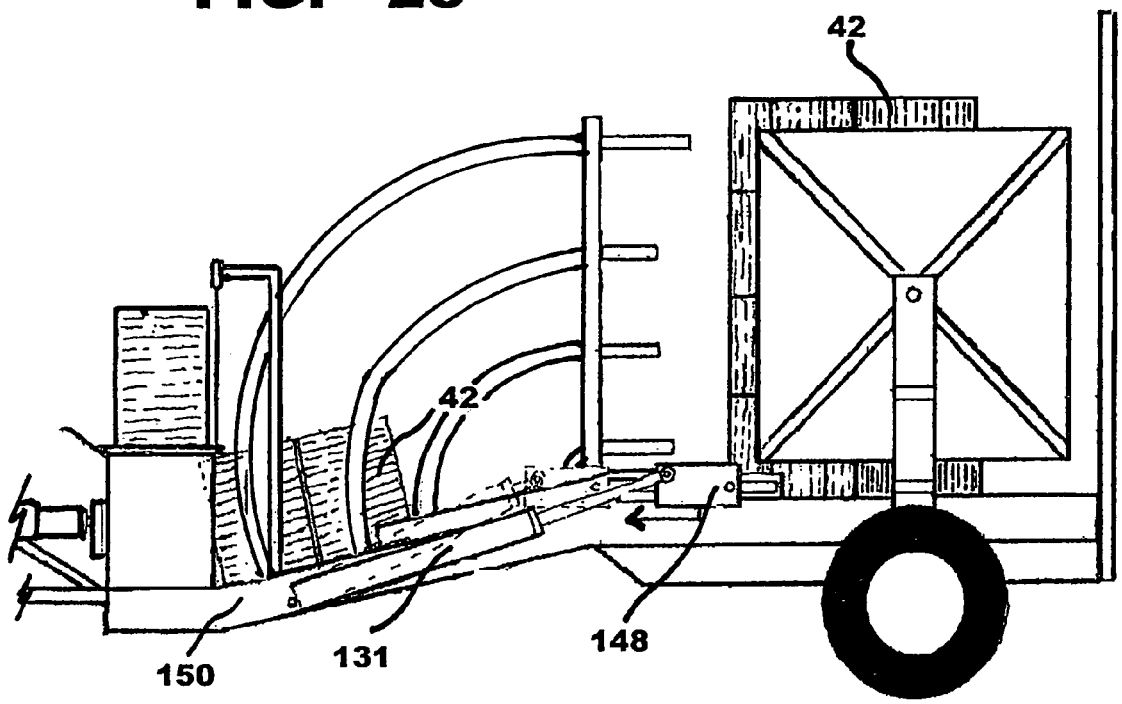
Figure 29:
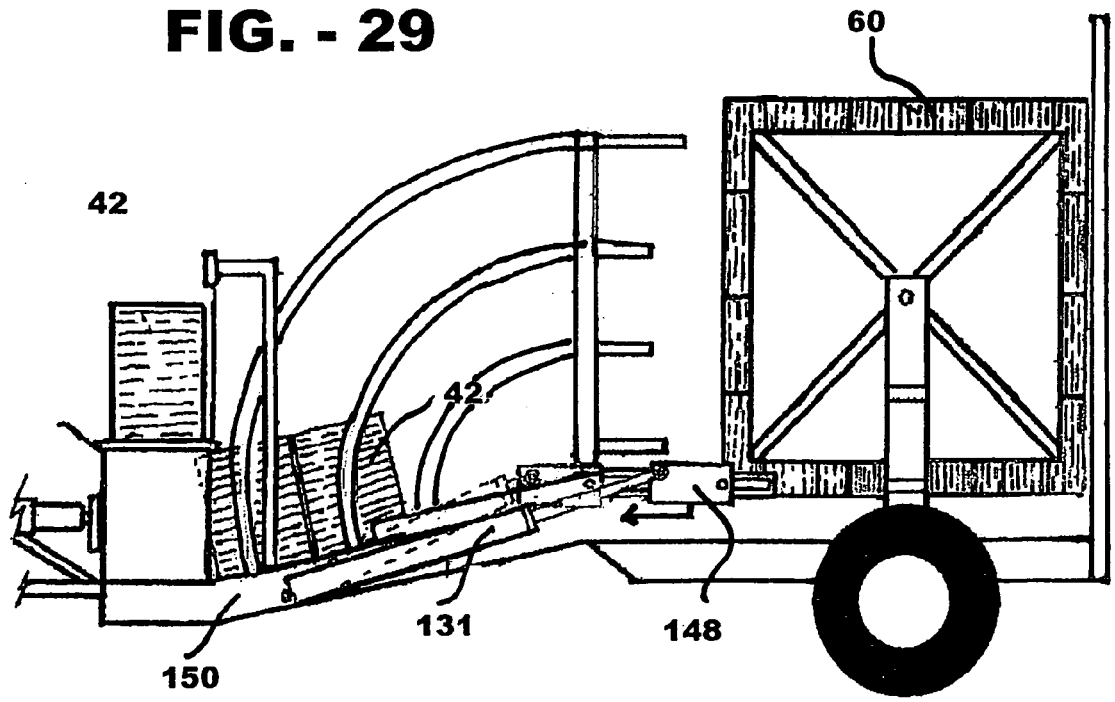
Figure 30:
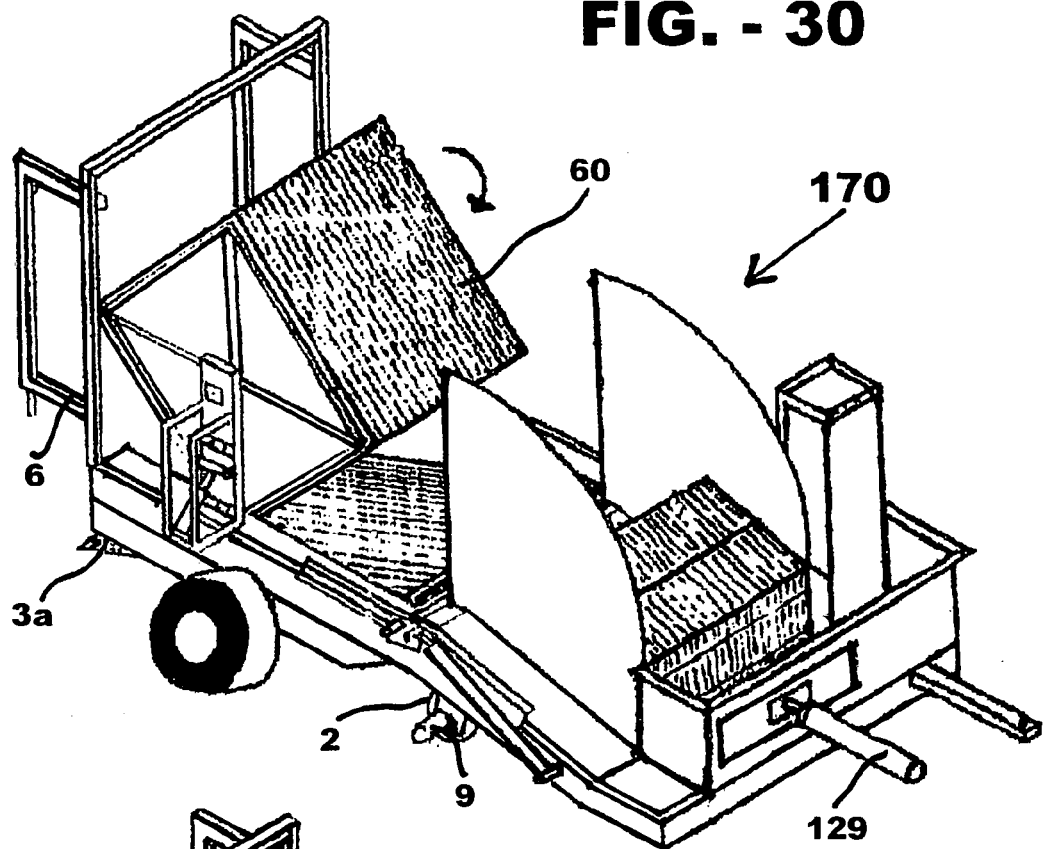
FIG. 30 and FIG. 31 are perspective views of the grouped hay bales being wrapped and ejected from the machine as the automatic bale-stacking machine begins stacking another group of hay bales.
Figure 31:
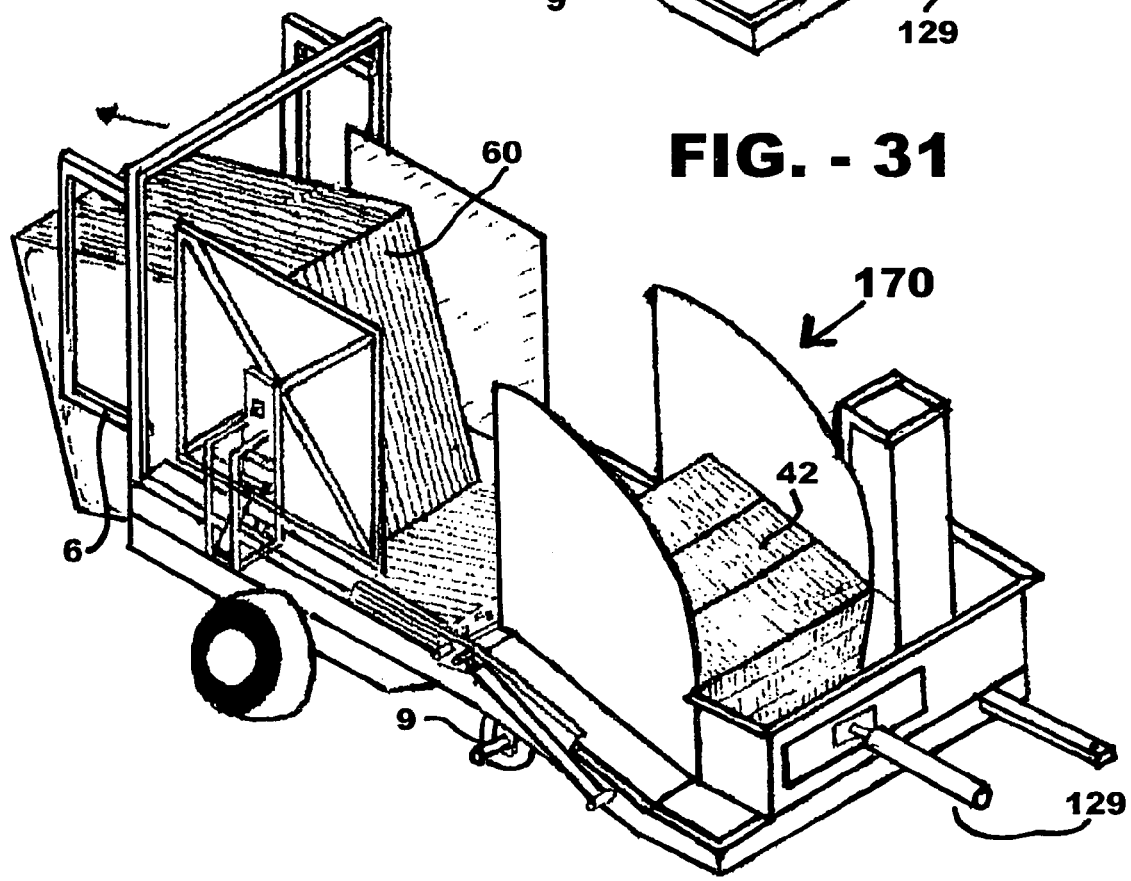

FIGS. 28 and 29 show this process repeated as two more rows of bales are positioned vertically between the clamping panels 4, until 12 bales are together to form a bundle of bales 60. Once the third row of bales is in place, the selector valve shown in FIG. 17 starts the wrapping and ejecting cycle of the bundle of bales, as shown in FIGS. 30 and 31.

On this basis, a description has been provided of a hay bale bundling machine and an optional automatic hay bale stacker. These two combined units will allow farmers to produce large hay bundles from standard size bales. Once so formed, such large hay bundles may then be manipulated and stored in the manner of large hay bales.

CONCLUSION

The foregoing has constituted a description of specific embodiments showing how the invention may be applied and put into use. These embodiments are only exemplary. The invention in its broadest, and more specific aspects is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

It is understood that suitable modifications and equivalents may be made without departing from the spirit of the invention.

I claim:

1. A hay bundling apparatus for wrapping a plurality of hay bales into a hay bale bundle comprising:
    a) a frame with a floor, the floor having a front end portion for receiving individual hay bales and a back end portion for dispensing bundled bales;
    b) a pair of clamping means mounted on the frame, each clamping means being positioned laterally on either side of a portion of the floor upon which hay bales are to be assembled, said clamping means being rotatable about a common axis which is fixed relative to the frame;
    c) first actuation means carried by the frame for effecting movement of the clamping means towards each other to grasp a stack of bales positioned there between;
    d) second actuation means to rotate the clamping means with the hay bales grasped between the clamping means;
    e) an adjustable portion of the floor which is capable of occupying two positions; rotate the bales;
    f) third actuation means for adjusting the position of said adjustable floor portion into said two positions with a first elevated position aligned to support the stack of bales in position to be grasped by the clamping means before rotation, and a second position wherein the floor is removed from beneath the assembled stack of bales after the clamping means have engaged the bales so as to provide sufficient clearance to permit the clamping means to rotate the bales;
    g) means for holding wrapping material on the frame such that the material is adapted to be dispensed for enveloping a bundle of bales being rotated by the clamping means;

whereby, when the floor is in the second position and a stack of bales has been grasped between the clamping means by actuation of the first actuation means, activation of the second actuation means will rotate the grasped bundle of hay bales allowing wrapping material to be dispensed and to envelop the bundle of hay bales.

2. A hay bundler as in claim 1 wherein the holding means for the wrapping material holds a roll of netting.

3. A hay bundler as in claim 1 comprising at least two wheels for movement along the ground.

4. A hay bundler as in claim 3 comprising coupling means for coupling the hay bundler to a tractor.

5. A hay bundler as in claim 1 wherein the adjustable portion of the floor is in the form of a trap door provided with a first end which is rotatably connected to the frame through a hinge means, allowing a second end of the floor portion to pivot downwardly from the first position, and further comprising latch means for detachably securing the second end of the adjustable portion of the floor to a fixed portion of the floor.

6. A hay baler according to claim 5, wherein said first end of the adjustable floor portion is at the front end, so that when said adjustable floor portion is pivoted down to a lowered position it provides a ramp allowing the bundled bales to slide off the apparatus after being released by the clamping means.

7. A hay baler according to claim 6, comprising a rear gate means positioned upright along a back end of the frame wherein the crate means is moveable from a closed position to contain hay bales on the floor before bundling to an open position to allow removal of the bundled bales from the frame thereafter wherein said rear gate means has locking means for engaging with the second end of the adjustable floor portion so that when the adjustable floor portion is in its second, lowered, position it releases said locking means and allows the gate means to open.

8. A hay baler according to claim 5, wherein said adjustable floor portion is provided with spring means urging the floor portion upwardly towards its first position, and wherein said third actuation means comprises projecting means on said clamping means which push the adjustable floor portion downwards when the clamping means starts to rotate.

9. A hay baler according to claim 1, wherein said clamping means is provided with spikes for engaging the bales.

10. A hay baler according to claim 1, wherein said clamping means is in the form of generally flat panels provided with spikes for engaging the bales.

11. A hay bundler as in claim 1 in combination with an automatic bale stacking apparatus, said automatic bale stacking apparatus comprising:
   a) a frame with a floor having a front portion for receiving individual hay bales produced by a hay baler wherein said bales arrive presented to the automatic bale stacking apparatus with a generally horizontal orientation, said floor also having a rear portion joined to the front floor portion of the hay bundler;
   b) a chute for receiving the bales provided with means to reorient such bales into an upright orientation so that they are directed towards a bale-receiving area of the floor with one of their smaller end faces being downwardly directed;
   c) an inclined surface extending upwardly within the bale-receiving area for redirecting the upended bail to fall laterally until it lies horizontally on the floor adjacent to the bail-receiving area, oriented transversely across the frame;
   d) a bale advancement mechanism mounted on the frame for advancing a hay bale lying on the floor along said rear portion of the stacking apparatus and towards said clamping means by at least the width of a hay bale;
   e) means to actuate the bale advancement mechanism until a plurality of ay bales lying on the floor have been advanced towards said clamping means to form a rack of hay bales;
   f) actuated arms mounted on said frame to swing the assembled row of bales upwardly through about a right angle to deposit the bales as a vertical stack on a portion of the floor proximate to the clamping means;
   g) bale positioning means to advance the stack of hay bales together as a group onto the floor surface towards the gate and between the clamping means;
   h) control means for repeating the cycle of subparagraphs e), f) and g) above a number of times until an assembled bundle of hay bales is present between the clamping means;

whereby said clamping means may then be advanced towards each other, grasping the assembled bundle of hay bales for rotation and envelopment by wrapping material.

12. A hay bundler and automatic bale stacking apparatus as in claim 11 comprising:
   a) separate frames for said respective hay bundler and automatic bale stacking apparatus; and
   b) coupling means for joining said separate frames.

13. A hay bundler and automatic bale stacking apparatus as in claim 12 comprising at least two wheels for movement along the ground.

14. A hay bundler and automatic bale stacking apparatus as in claim 13 comprising coupling means for coupling the hay bundler and automatic bale stacking apparatus to a tractor.

15. A hay bundling apparatus for wrapping a plurality of hay bales into a hay bale bundle comprising:
   a) a support surface for receiving as a stack individual hay bales to be assembled into a bundle;
   b) a pair of clamping means positioned for grasping said stack of hay bales, said clamping means being rotatable about a fixed axis;
   d) first actuation means for effecting movement of the clamping means to grasp the stack of bales when it is positioned on the support surface;
   e) second actuation means to rotate the clamping means and stack of hay bales grasped between the clamping means; and
   f) third actuation means for adjusting the position of the support surface into two positions with a first position supporting the stack of bales in position between the clamping means before rotation, and a second position wherein the support surface is removed from beneath the stack of bales after the clamping means have engaged the bales so as to provide sufficient clearance to permit the clamping means to rotate the stack of bales.

16. A hay bundling apparatus as in claim 15 comprising:
   a) means for dispensing wrapping material for enveloping the stack of bales while the stack is being rotated by the clamping means, whereby, when the floor is in the second position with the stack of bales grasped between and being rotated by the clamping means, wrapping material may be dispensed to envelop the stack of hay bales to form said hay bundle.

* * * * *